(12) United States Patent
Iwasaki et al.

(10) Patent No.: US 11,746,211 B2
(45) Date of Patent: Sep. 5, 2023

(54) CRYSTAL NUCLEATOR FOR POLYOLEFIN RESINS, METHOD FOR PRODUCING CRYSTAL NUCLEATOR FOR POLYOLEFIN RESINS, AND METHOD FOR IMPROVING FLUIDITY OF CRYSTAL NUCLEATOR FOR POLYOLEFIN RESINS

(71) Applicant: NEW JAPAN CHEMICAL CO., LTD., Kyoto (JP)

(72) Inventors: Shohei Iwasaki, Kyoto (JP); Yohei Uchiyama, Kyoto (JP); Takayuki Maeda, Kyoto (JP); Tomoyuki Miyata, Kanagawa (JP)

(73) Assignee: NEW JAPAN CHEMICAL CO., LTD., Kyoto (JP)

( * ) Notice: Subject to any disclaimer, the term of this patent is extended or adjusted under 35 U.S.C. 154(b) by 0 days.

(21) Appl. No.: 16/333,387

(22) PCT Filed: Sep. 13, 2017

(86) PCT No.: PCT/JP2017/033009
§ 371 (c)(1),
(2) Date: Mar. 14, 2019

(87) PCT Pub. No.: WO2018/052010
PCT Pub. Date: Mar. 22, 2018

(65) Prior Publication Data
US 2019/0248980 A1  Aug. 15, 2019

(30) Foreign Application Priority Data

Sep. 16, 2016 (JP) ................................ 2016-181073
Sep. 16, 2016 (JP) ................................ 2016-181526

(51) Int. Cl.
| | |
|---|---|
| *C08K 5/00* | (2006.01) |
| *C08K 5/1575* | (2006.01) |
| *C08L 23/00* | (2006.01) |
| *C08K 5/103* | (2006.01) |
| *C08K 5/42* | (2006.01) |
| *C08L 23/02* | (2006.01) |

(52) U.S. Cl.
CPC ............ *C08K 5/0083* (2013.01); *C08K 5/103* (2013.01); *C08K 5/1575* (2013.01); *C08K 5/42* (2013.01); *C08L 23/00* (2013.01); *C08K 2201/005* (2013.01); *C08L 23/02* (2013.01); *C08L 2205/24* (2013.01)

(58) Field of Classification Search
CPC .... C07D 493/04; C08K 5/098; C08K 5/1575; C08K 5/20; C08K 5/527; C08K 5/0083; C08K 5/103; C08K 5/42; C08L 23/00
See application file for complete search history.

(56) References Cited

U.S. PATENT DOCUMENTS

| | | |
|---|---|---|
| 4,314,039 A | 2/1982 | Kawai et al. |
| 4,388,119 A | 6/1983 | Uchiyama |
| 4,739,102 A | 4/1988 | Tokunaga |
| 4,954,291 A | 9/1990 | Kobayashi et al. |
| 5,198,484 A | 3/1993 | Mannion |
| 6,245,843 B1 | 6/2001 | Kobayashi et al. |
| 6,417,254 B1 | 7/2002 | Kobayashi |
| 6,673,856 B1 | 1/2004 | Mentink |
| 9,206,138 B2 | 12/2015 | Maeda et al. |
| 10,138,275 B2 | 11/2018 | Liu et al. |
| 10,894,874 B2 | 1/2021 | Iwasaki et al. |
| 2002/0028864 A1* | 3/2002 | Kobayashi ........... C08K 5/1575 524/109 |
| 2003/0077327 A1 | 4/2003 | Durig et al. |
| 2003/0109610 A1 | 6/2003 | Nomoto et al. |
| 2005/0171230 A1 | 8/2005 | Ishikawa et al. |
| 2006/0173108 A1 | 8/2006 | Xu et al. |
| 2010/0040813 A1 | 2/2010 | Wada et al. |
| 2011/0105657 A1* | 5/2011 | Tanji ..................... C08K 5/527 524/108 |

(Continued)

FOREIGN PATENT DOCUMENTS

| | | |
|---|---|---|
| CN | 1241190 A | 1/2000 |
| CN | 1246881 A | 3/2000 |

(Continued)

OTHER PUBLICATIONS

Extended European Search Report issued in European Application No. 17850911.3, dated Apr. 8, 2020 (11 pages).

(Continued)

*Primary Examiner* — John E Uselding
(74) *Attorney, Agent, or Firm* — Osha Bergman Watanabe & Burton LLP

(57) ABSTRACT

A crystal nucleating agent for polyolefin resins includes at least a raw material crystal nucleating agent (a) as a component (A), where the component (A) may be a diacetal compound. The crystal nucleating agent may have an angle of repose of 48° or smaller, and a 1-mm-thick polyolefin resin molded article produced using the crystal nucleating agent may have a haze value of 12 (percent) or smaller as determined by a method in conformity with JIS K7136 (2000). The crystal nucleating agent may be a blend including a sulfuric acid ester salt and/or a sulfonic acid salt as a component (E) and a higher fatty acid as a component (F). The blend may be obtained by preparing a mixture of the component (A) swelled with an organic solvent, the component (E) dissolved in the organic solvent, and the component (F) and removing the organic solvent from the mixture.

8 Claims, No Drawings

(56) References Cited

U.S. PATENT DOCUMENTS

| | | |
|---|---|---|
| 2012/0048146 A1 | 3/2012 | Wyart et al. |
| 2012/0296018 A1 | 11/2012 | Haruna et al. |
| 2015/0152248 A1 | 6/2015 | Kawamoto et al. |
| 2016/0115295 A1 | 4/2016 | Yamazaki et al. |
| 2020/0131331 A1 | 4/2020 | Zhao et al. |

FOREIGN PATENT DOCUMENTS

| | | |
|---|---|---|
| CN | 1649951 A | 8/2005 |
| CN | 101111551 A | 1/2008 |
| CN | 101511930 A | 8/2009 |
| CN | 103497484 A | 1/2014 |
| CN | 104379612 A | 2/2015 |
| CN | 104910616 A | 9/2015 |
| CN | 106715556 A | 5/2017 |
| EP | 1209190 A1 | 5/2002 |
| EP | 1375583 A1 | 1/2004 |
| JP | S51122150 A | 10/1976 |
| JP | S5721440 A | 2/1982 |
| JP | S5947705 B2 | 11/1984 |
| JP | S60101131 A | 6/1985 |
| JP | H06-145431 A | 5/1994 |
| JP | H06145431 A | 5/1994 |
| JP | H07032454 A | 2/1995 |
| JP | H07118512 A | 5/1995 |
| JP | H08-245843 A | 9/1996 |
| JP | 2001081236 A | 3/2001 |
| JP | 2001-240698 A | 9/2001 |
| JP | 2002060602 A | 2/2002 |
| JP | 2002332359 A | 11/2002 |
| JP | 2002356586 A | 12/2002 |
| JP | 2003096246 A | 4/2003 |
| JP | 2007-297465 A | 11/2007 |
| JP | 2009-507982 A | 2/2009 |
| JP | 2009507982 A | 2/2009 |
| JP | 2010275535 A | 12/2010 |
| JP | 2011207991 A | 10/2011 |
| JP | 2012233149 A | 11/2012 |
| JP | 2013209662 A | 10/2013 |
| JP | 2015030849 A | 2/2015 |
| JP | 5920524 B2 | 5/2016 |
| JP | 2016121303 A | 7/2016 |
| WO | 98/33851 A1 | 8/1998 |
| WO | 9833851 A1 | 8/1998 |
| WO | 9918108 A1 | 4/1999 |
| WO | 02077094 A1 | 10/2002 |
| WO | 2006083640 A1 | 8/2006 |
| WO | 2007032797 A1 | 3/2007 |
| WO | 2009139350 A1 | 11/2009 |
| WO | 2011122264 A1 | 10/2011 |
| WO | 2014136824 A1 | 9/2014 |
| WO | 2014192812 A1 | 12/2014 |
| WO | 2015180680 A1 | 12/2015 |
| WO | 2016088767 A1 | 6/2016 |

OTHER PUBLICATIONS

Office Action issued in corresponding Japanese Application No. 2016181073; dated Dec. 24, 2019 (15 pages).
International Search Report issued in International Application No. PCT/JP2017/033009, dated Oct. 31, 2017 (2 pages).
Written Opinion issued in International Application No. PCT/JP2017/033009; dated Oct. 31, 2017 (3 pages).
International Search Report issued in International Application No. PCT/JP2017/028740; dated Oct. 31, 2017 (1 page).
Written Opinion of the International Searching Authority issued in International Application No. PCT/JP2017/028740 dated Oct. 31, 2017 (3 pages).
Ma, C. et al.,"Research Advance on Nucleating Agents of PP," Modern Plastics Processing and Applications, pp. 41-44, Feb. 2002 (4 pages) with English Abstract.
Li, C. et al., "Morphology, Crystallization Behavior and Tensile Properties of β-Nucleated Isotactic Polypropylene Fibrous Membranes Prepared by Melt Electrospinning," Chinese Journal of Polymer Science, vol. 32, No. 9, pp. 1167-1175, Apr. 21, 2014 (9 pages).
Office Action issued in counterpart Chinese Application No. 201780055021.5; dated Jan. 24, 2022 (10 pages).
International Search Report issued in International Application No. PCT/JP2017/026379; dated Oct. 24, 2017 (4 pages).
Written Opinion of the International Searching Authority issued in International Application No. PCT/JP2017/026379 dated Oct. 24, 2017 (9 pages).
Database WPI Week201641, Thompson Scientific, london, GB; XP-002797357 (2 pages), 2016.
Extended European Search Report issued in European Application No. 17834169.9 , dated Feb. 14, 2020 (9 pages).
Office Action issued in corresponding Chinese Application No. 201780047038.6, dated Sep. 14, 2020 (10 pages).
Office Action issued in Chinese Application No. 201780047038.6, dated May 24, 2021 (15 pages).
Notice of Reasons for Revocation issued in Japanese Application No. 2016-149528, dated Mar. 4, 2021 (26 pages).
Office Action issued in U.S. Appl. No. 16/321,775; dated Apr. 5, 2022 (21 pages).
Non-Final Office Action issued in related U.S. Appl. No. 16/321,775, dated Aug. 18, 2022 (11 pages).

\* cited by examiner

CRYSTAL NUCLEATOR FOR POLYOLEFIN RESINS, METHOD FOR PRODUCING CRYSTAL NUCLEATOR FOR POLYOLEFIN RESINS, AND METHOD FOR IMPROVING FLUIDITY OF CRYSTAL NUCLEATOR FOR POLYOLEFIN RESINS

TECHNICAL FIELD

The present invention relates to improvement of the fluidity of a crystal nucleating agent for polyolefin resins. Specifically, the present invention relates to a method for improving the fluidity, a method for producing a crystal nucleating agent for polyolefin resins with improved fluidity including the above method, a crystal nucleating agent for polyolefin resins with improved fluidity obtained by the method, and a highly transparent polyolefin resin composition and a molded article thereof each prepared using the crystal nucleating agent.

BACKGROUND ART

Polyolefin resins such as polyethylene or polypropylene are inexpensive and have well-balanced properties, and therefore are used for various applications as general-purpose plastics. Polyolefin resins are commonly crystalline and are often used together with a crystal nucleating agent with an aim of improving the production efficiency or with an aim of improving the mechanical properties, thermal properties, and optical properties. In particular, the use of a crystal nucleating agent is essential for improvement of the transparency that is an optical property.

The crystal nucleating agent is classified as an inorganic crystal nucleating agent (e.g., talc) or an organic crystal nucleating agent (e.g., a diacetal compound, a metal salt of a carboxylic acid or a phosphoric acid ester). The organic crystal nucleating agent is further classified as a soluble crystal nucleating agent or an insoluble crystal nucleating agent. For improvement of the optical properties such as transparency, a soluble organic crystal nucleating agent typified by the diacetal compound is particularly effective and is often used.

A feature of general-purpose plastics, particularly polyolefin resins, is inexpensiveness. For achieving this feature, excellent productivity is important, and various measures have been devised such as shortening of the molding cycle by addition of a crystal nucleating agent as described above. The feeding property of the raw material is also important, and each raw material needs to have an excellent feed property, i.e., excellent fluidity. However, the crystal nucleating agent, particularly a diacetal crystal nucleating agent, has poor fluidity to be disadvantageous in terms of productivity.

Various efforts therefore have been made on improvement of the fluidity of a crystal nucleating agent including diacetal compounds. For example, methods for improving the fluidity by granulation (Patent Literatures 1 to 4), methods for improving the fluidity not by granulation but by adding a fluidity improver (Patent Literatures 5 to 8), and like methods have been proposed, and these methods are used in practice.

The dispersibility or solubility in polyolefin resins of a crystal nucleating agent for polyolefin resins, especially a crystal nucleating agent such as a diacetal compound, is known to greatly affect the performance as a crystal nucleating agent. Various efforts therefore have been made to improve the dispersibility or solubility and thereby improve the performance as a crystal nucleating agent. For example, Patent Literatures 9 proposes a method of making crystal nucleating particles finer. Patent Literatures 10 to 12 propose methods of adding carboxylic acids or metal salts thereof. Patent Literature 13 proposes a method of adding a phenolic antioxidant. The applicant of the present application reports in Patent Literature 1 and Patent Literature 14 that adding a specific compound lowers the melting point of a crystal nucleating agent, thus leading to improvement of the dispersibility or solubility in resin and improvement of the performance as a crystal nucleating agent.

Recently, general-purpose plastics are desired to have further improved productivity, and the feeding property, i.e., fluidity, of the raw material has been desired to be further improved. Further improvement of the fluidity of the crystal nucleating agent, particularly a diacetal crystal nucleating agent, has been a difficult issue for improvement of the productivity.

Although the conventional methods including granulation as described above can improve the fluidity, they tend to lower the dispersibility or solubility in polyolefin resins. As a result, not only a problem of lowering the original properties of the nucleating agent, such as transparency, but also a problem in relation to the appearance such as white spots may arise. Accordingly, in the field which has particularly strict requirements for the dispersibility, a method of adding additives such as a binder is commonly employed, and the selection of the binder is important.

As the binder, various compounds have been considered. An organic acid monoglyceride that is widely used as an additive for polyolefins, such as an antistatic agent or a lubricant, is known as a highly usable binder.

The granulation method is also important in relation to the fluidity, and the method has been studied in various ways. Currently, the extrusion granulation method and compression granulation method are common and widely used.

As a recent trend, in overall consideration of the environmental problems or the like, or with an aim of ensuring the flexibility of the compounding formulation, the amount of a component other than the crystal nucleating agent is being reduced as far as possible. Now, a method for performing granulation with as small an amount of a binder as possible is desired. In some applications, an influence of a binder on the performance of the nucleating agent itself is concerned. From this standpoint too, reduction of the binder amount is desired. However, when the amount of a binder is less than a certain amount, granulation by the extrusion granulation method or the compression granulation is difficult, and therefore, there is a limit on reduction of the binder amount.

Moreover, in some applications, requirements in relation to the dispersibility or solubility in resin described above are becoming stricter, so that a large amount of a binder having a relatively low melting point, such as an organic acid monoglyceride, needs to be added. In such a case, however, another problem such as caking caused by the binder arises and the problem needs to be addressed.

In particular, in the case of a crystal nucleating agent such as a diacetal compound, there is a problem in relation to the secondary aggregation properties or the like. In addition, the dispersibility or solubility in melted resin is known to markedly influence the nucleating agent performance. It is difficult to satisfy all the requirements sufficiently by granulation in a conventionally known system, and improvement of the state of the art is strongly desired.

In applications which put importance on the dispersibility or solubility in polyolefin resins, there is a demand for a method for improving the fluidity and the dispersibility or solubility in polyolefin resins at the same time.

CITATION LIST

Patent Literature

Patent Literature 1: WO 98/33851
Patent Literature 2: JP 2001-81236 A
Patent Literature 3: JP 2002-332359 A
Patent Literature 4: JP 2003-096246 A
Patent Literature 5: JP 2009-507982 T
Patent Literature 6: JP 2013-209662 A
Patent Literature 7: JP 2015-30849 A
Patent Literature 8: JP 5920524 B
Patent Literature 9: JP H06-145431 A
Patent Literature 10: JP S51-122150 A
Patent Literature 11: JP S57-21440 A
Patent Literature 12: JP S60-101131 A
Patent Literature 13: JP 2011-207991 A
Patent Literature 14: WO 02/077094

SUMMARY OF INVENTION

Technical Problem

The present invention aims to provide a method for improving the fluidity of a crystal nucleating agent for polyolefin resins, a method for producing a crystal nucleating agent for polyolefin resins with improved fluidity including the above method, a crystal nucleating agent for polyolefin resins with improved fluidity obtained by the method, and a highly transparent polyolefin resin composition and a molded article thereof each prepared using the crystal nucleating agent.

Solution to Problem

In view of the situation in the art, the present inventors made intensive studies to solve the above problems. They found out that the following crystal nucleating agent for polyolefin resin can satisfy desired fluidity and desired dispersibility or solubility in polyolefin resins at the same time: a crystal nucleating agent for polyolefin resins containing a raw material crystal nucleating agent (a), wherein the crystal nucleating agent for polyolefin resins has an angle of repose within a specific range, and a 1-mm-thick polyolefin resin molded article produced using the crystal nucleating agent for polyolefin resins has a specific haze value. The inventors thus completed the present invention.

Such a crystal nucleating agent for polyolefin resins with an angle of repose and a haze value each in a specific range can be suitably obtained by adding a specific compound having a binder effect at a specific ratio and mixing under stirring under specific conditions. The crystal nucleating agent for polyolefin resins also can be suitably obtained by mixing specific compounds at a specific ratio under specific conditions.

The present invention provides, as described below, a method for improving the fluidity of a crystal nucleating agent for polyolefin resins, a method for producing a crystal nucleating agent for polyolefin resins with improved fluidity including the above method, a crystal nucleating agent for polyolefin resins with improved fluidity obtained by the method, and a highly transparent polyolefin resin composition and molded article thereof each containing the crystal nucleating agent.

The present invention relates to a crystal nucleating agent for polyolefin resins, the crystal nucleating agent including at least a raw material crystal nucleating agent (a) as a component (A), wherein the crystal nucleating agent for polyolefin resins has an angle of repose of 48° or smaller, and a 1-mm-thick polyolefin resin molded article produced using the crystal nucleating agent for polyolefin resins has a haze value of 12 or smaller as determined by a method in conformity with JIS K7136 (2000).

The crystal nucleating agent for polyolefin resins of the present invention preferably has a compression ratio determined from an aerated bulk density and a packed bulk density (packed bulk density/aerated bulk density) of 1.4 or lower.

The component (A) is preferably a diacetal compound represented by the following formula (1):

[Chem. 1]

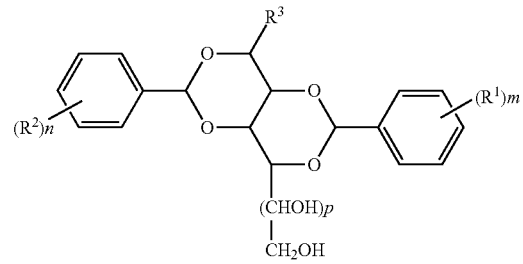

(1)

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

Preferably, in the formula (1), $R^1$ and $R^2$ are the same as or different from each other and each represent a methyl group or an ethyl group, $R^3$ represents a hydrogen atom, m and n each represent an integer of 1 or 2, and p represents 1.

Preferably, in the formula (1), $R^1$ and $R^2$ are the same as or different from each other and each represent a propyl group or a propoxy group, $R^3$ represents a propyl group or a propenyl group, m and n each represent 1, and p represents 1.

The crystal nucleating agent for polyolefin resins of the present invention is preferably a blend including an organic acid monoglyceride as a component (B) and an organic compound having a melting point of 100° C. or higher as a component (C), wherein the component (A) accounts for 60 to 80% by weight of the crystal nucleating agent for polyolefin resins, the component (B) accounts for 10 to 30% by weight of the crystal nucleating agent for polyolefin resins, the component (B) and the component (C) in total account for 20 to 40% by weight of the crystal nucleating agent for polyolefin resins, and the component (B) accounts for 30 to 80% by weight of the total amount of the component (B) and the component (C), and the blend is prepared by heat-mixing while controlling a powder temperature at a temperature of not lower than the melting point of the component (B) and not higher than the melting point of the component (C).

The component (B) is preferably a monoglyceride of a fatty acid that may have at least one hydroxy group in a molecule.

The component (C) is preferably one or two or more compounds selected from the group consisting of an alkali or alkaline earth metal salt of a C14-C22 saturated fatty acid, a hindered phenol compound, and a phosphorous acid ester compound.

The crystal nucleating agent for polyolefin resins of the present invention preferably includes: a blend of the component (A), the component (B), and the component (C) as a core; and particles of a raw material crystal nucleating agent (b) as a component (D) adhered to the core.

The amount of the component (D) adhered is preferably 1 to 20 parts by weight relative to 100 parts by weight of the crystal nucleating agent for polyolefin resins as the core.

The component (D) is preferably a diacetal compound represented by the following formula (1):

[Chem. 2]

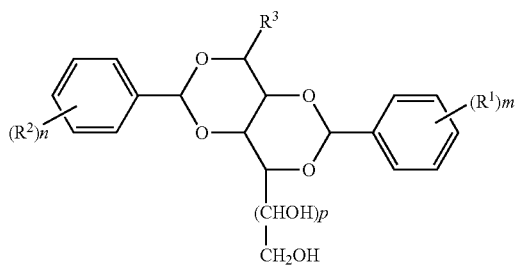

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

The crystal nucleating agent for polyolefin resins of the present invention is preferably a heat-stirring granulation product.

The crystal nucleating agent for polyolefin resins of the present invention is preferably a blend including a sulfuric acid ester salt and/or a sulfonic acid salt as a component (E) and a higher fatty acid as a component (F), wherein the blend contains the component (E) in an amount of 0.1 to 5 parts by weight relative to 100 parts by weight of the component (A), and the component (F) in an amount of 0.3 to 5 parts by weight relative to 100 parts by weight of the component (A), and has a ratio of the component (E) to the component (F), (E)/(F), in a range of 1/3 to 4/1, and the blend is obtained by preparing a mixture of the component (A) swelled with an organic solvent, the component (E) dissolved in the organic solvent, and the component (F) in a powdery or granular form and removing the organic solvent from the mixture.

The component (E) is preferably at least one selected from the group consisting of a C8-C24 alkyl sulfuric acid ester salt, a polyoxyethylene C8-C22 alkyl ether sulfuric acid ester salt having an average number of moles of ethylene oxide added of 1 to 8, and a C6-C20 alkyl benzene sulfonic acid salt.

The component (F) is preferably a C12-C24 saturated fatty acid that may have at least one hydroxy group in a molecule.

The organic solvent is preferably a C1-C4 lower alcohol.

The present invention also relates to a method for producing a crystal nucleating agent for polyolefin resins, including (i) subjecting a raw material crystal nucleating agent (a) as a component (A), an organic acid monoglyceride as a component (B), and an organic compound having a melting point of 100° C. or higher as a component (C) to stirring granulation while controlling a powder temperature at a temperature of not lower than the melting point of the component (B) and not higher than the melting point of the component (C).

The method preferably includes (ii) adding a raw material crystal nucleating agent (b) as a component (D) to the crystal nucleating agent for polyolefin resins obtained in the step (i) and heat-mixing the component (D) and the crystal nucleating agent for polyolefin resins while controlling the powder temperature at a temperature of not lower than the melting point of the component (C) and lower than the powder temperature in the step (i).

The present invention also relates to a method for producing a crystal nucleating agent for polyolefin resins, including mixing a raw material crystal nucleating agent (a) as a component (A) swelled with an organic solvent, 0.1 to 5 parts by weight of a sulfuric acid ester salt and/or a sulfonic acid salt as a component (E) dissolved in the organic solvent relative to 100 parts by weight of the component (A), and 0.3 to 5 parts by weight of a higher fatty acid as a component (F) in a powdery or granular form relative to 100 parts by weight of the component (A) to a ratio of the component (E) to the component (F), (E)/(F), of 1/3 to 4/1, followed by removing the organic solvent.

The present invention also relates to a polyolefin resin composition including: a polyolefin resin; and the crystal nucleating agent for polyolefin resins or a crystal nucleating agent for polyolefin resins produced by the method for producing a crystal nucleating agent for polyolefin resins.

The present invention also relates to a polyolefin resin molded article produced using the polyolefin resin composition as a raw material.

The present invention also relates to a method for improving the fluidity of a nucleating agent for polyolefin resins, including granulating a raw material crystal nucleating agent (a) as a component (A), an organic acid monoglyceride as a component (B), and an organic compound having a melting point of 100° C. or higher as a component (C) by mixing under stirring while controlling a powder temperature at a temperature of not lower than the melting point of the component (B) and not higher than the melting point of the component (C).

Preferably, a raw material crystal nucleating agent (b) as a component (D) is added to a crystal nucleating agent for polyolefin resins granulated by the method for improving the fluidity of a nucleating agent for polyolefin resins, and the crystal nucleating agent for polyolefin resins and the component (D) are granulated by heat-mixing while controlling a powder temperature at a temperature of not lower than the melting point of the component (B) and lower than the powder temperature in the mixing under stirring in the method for improving the fluidity of a nucleating agent for polyolefin resins.

The present invention also relates to a method for improving the fluidity of a nucleating agent for polyolefin resins, including mixing a raw material crystal nucleating agent (a) as a component (A) swelled with an organic solvent, 0.1 to 5 parts by weight of a sulfuric acid ester salt and/or a sulfonic acid salt as a component (E) dissolved in the organic solvent relative to 100 parts by weight of the component (A), and 0.3 to 5 parts by weight of a higher fatty acid as a component (F) in a powdery or granular form relative to 100 parts by weight of the component (A) to a ratio of the component (E) to the component (F), (E)/(F), of 1/3 to 4/1, followed by removing the organic solvent.

Advantageous Effects of Invention

The crystal nucleating agent for polyolefin resins of the present invention has very excellent fluidity to remarkably contribute to the improvement of the productivity or the like. Also in terms of the dispersibility or solubility in polyolefin resins, which is very important particularly for diacetal compounds, the crystal nucleating agent for polyolefin resins of the present invention is equal to or greater than conventional crystal nucleating agents. Thus, it can exhibit very excellent performance as a crystal nucleating agent. Consequently, the crystal nucleating agent for polyolefin resins of the present invention is widely usable in various applications, and molded articles obtained therefrom have very excellent transparency, being useful in many applications.

DESCRIPTION OF EMBODIMENTS

<Crystal Nucleating Agent for Polyolefin Resins>

The crystal nucleating agent for polyolefin resins of the present invention contains at least a raw material crystal nucleating agent (a) as a component (A). The raw material crystal nucleating agent (a) is not particularly limited as long as it can be used as a crystal nucleating agent for polyolefin resins. The raw material crystal nucleating agent (a) may suitably be one having the size, shape, and composition described later.

The crystal nucleating agent for polyolefin resins of the present invention has an angle of repose of 48° or smaller. The crystal nucleating agent for polyolefin resins having an angle of repose of 48° or smaller can provide sufficient fluidity. The angle of repose is preferably 46° or smaller, more preferably 40° or smaller, still more preferably 35° or smaller.

The angle of repose is determined as follows. Under the conditions of a temperature of 25° C. and a humidity of 60%, the crystal nucleating agent for polyolefin resins in an amount of 30 g was fed into a funnel having an opening section with a diameter of 9 cm and a hole with a diameter of 1 cm from the height of 1 cm above the upper edge of the funnel, and dropped without vibration onto a circular stage with a diameter of 9 cm placed 10 cm below the lower outlet of the funnel. The height of the conical deposition of the dropped crystal nucleating agent was measured, and the angle formed between the horizontal plane and the generatrix was obtained by calculation as the angle of repose (unit: degree).

In the crystal nucleating agent for polyolefin resins of the present invention, a 1-mm-thick polyolefin resin molded article produced using the crystal nucleating agent for polyolefin resins has a haze value of 12 or smaller as determined by a method in conformity with JIS K7136 (2000). With a haze value of 12 or smaller, the polyolefin resin molded article produced using the crystal nucleating agent for polyolefin resins of the present invention has a very excellent transparency, and thus is useful in many applications. The haze value is preferably 10 or smaller, more preferably 8 or smaller.

The haze value is specifically measured in the following method.

An amount of 100 parts by weight of a commercially available polypropylene random copolymer and the crystal nucleating agent for polyolefin resins of the present invention were melted and mixed at a barrel temperature of 250° C. such that the amount of the raw material crystal nucleating agent (a) was 0.2 parts by weight. The extruded strands were then cooled and cut using a pelletizer to prepare a polyolefin resin composition. The polyolefin resin composition was molded using a general-purpose injection molding apparatus under the conditions of an injection molding temperature (heating temperature) of 240° C. and a die temperature (cooling temperature) of 40° C. The resulting 1-mm-thick polyolefin resin molded article was used as an evaluation sample. The haze value was determined by measuring the haze value of the evaluation sample with a general-purpose haze meter by a method in conformity with JIS K7136 (2000).

The crystal nucleating agent for polyolefin resins of the present invention preferably has a compression ratio determined from the aerated bulk density and the packed bulk density (packed bulk density/aerated bulk density) of 1.4 or lower, more preferably 1.2 or lower. Typically, a crystal nucleating agent for polyolefin resins having a compression ratio closer to 1 tends to have higher fluidity. With the compression ratio within the above range, the crystal nucleating agent for polyolefin resins can achieve further improved fluidity.

Here, the bulk density refers to the density of a material filled in a container, calculated using the interior capacity of the container as the volume of the material. The bulk density obtained by calculation performed on a material slowly (without pressurization) filled in the container to a roughly packed state is the aerated bulk density, and the bulk density obtained calculation performed on the material further tapped under a certain condition to a densely packed state is the packed bulk density. In the case of a granulation product, for example, the granulation product with a larger bulk density is commonly considered to have fewer voids therein to be tightly compacted. In the case where the bulk density is markedly increased after granulation when the bulk densities before and after the granulation are compared, production of a favorable granulation product in which voids among particles present before the granulation are decreased can be confirmed.

The bulk density is a value easily obtainable by measuring the capacity of the container and the weight of the contents filled therein as described above, and it can be obtained, for example, by the following method.

A funnel is set on the opening of a measuring cylinder vertically, and a predetermined amount of a sample is slowly (without pressurization) filled into the measuring cylinder thorough the funnel, and the weight of the sample in the measuring cylinder is measured using a scale. The aerated bulk density is obtained by the following equation (1) using the obtained weight. Subsequently, the measuring cylinder is dropped onto a rubber sheet or the like from a certain height (tapping) for a predetermined times, and the volume of the sample in the measuring cylinder is read. The packed bulk density is obtained by the following equation (2). The compression ratio is determined by the following equation (3) using the obtained aerated bulk density and packed density.

$$\text{Aerated bulk density (g/cm}^3\text{)} = \text{Weight of sample (g)} / \text{Capacity of measuring cylinder (cm}^3\text{)} \quad \text{Equation (1):}$$

$$\text{Packed bulk density (g/cm}^3\text{)} = \text{Weight of sample (g)} / \text{Volume of sample after tapping (cm}^3\text{)} \quad \text{Equation (2):}$$

$$\text{Compression ratio} = \text{Packed bulk density} / \text{Aerated bulk density} \quad \text{Equation (3):}$$

The component (A) is preferably a diacetal compound represented by the following formula (1):

[Chem. 3]

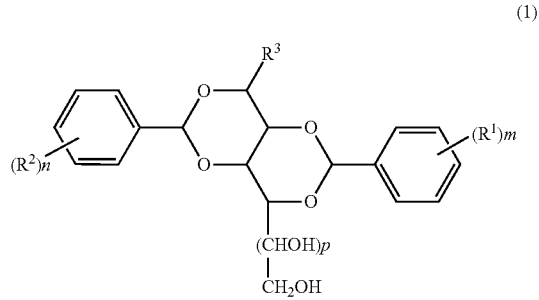

(1)

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

Among the diacetal compounds, more preferred are, for example, compounds represented by the formula (1) wherein $R^1$ and $R^2$ are the same as or different from each other and each represent a methyl group or an ethyl group, $R^3$ represents a hydrogen atom, m and n each represent an integer of 1 or 2, and p represents 1 and compounds represented by the formula (1) wherein $R^1$ and $R^2$ each represent a propyl group or a propyloxy group, $R^3$ represents a propyl group or a propenyl group, m and n each represent 1, and p represents 1.

In addition, examples of more preferred compounds include the following compounds: compounds represented by the formula (1) wherein $R^1$ and $R^2$ each represent a propyl group or a propyloxy group, $R^3$ represents a propyl group or a propenyl group, m and n each represents 1, and p represents 1.

As specific embodiments of the diacetal compounds, the following compounds can be exemplified: 1,3:2,4-di-O-benzylidene-D-sorbitol, 1,3:2,4-bis-O-(methylbenzylidene)-D-sorbitol, 1,3:2,4-bis-O-(o-methylbenzylidene)-D-sorbitol, 1,3:2,4-bis-O-(m-methylbenzylidene)-D-sorbitol, 1,3:2,4-bis-O-(p-methylbenzylidene)-D-sorbitol, 1,3:2,4-bis-O-(ethylbenzylidene)-D-sorbitol, 1,3:2,4-bis-O-(o-ethylbenzylidene)-D-sorbitol, 1,3:2,4-bis-O-(m-ethylbenzylidene)-D-sorbitol, 1,3:2,4-bis-O-(p-ethylbenzylidene)-D-sorbitol, 1,3:2,4-bis-O-(o-isopropylbenzylidene)-D-sorbitol, 1,3:2,4-bis-O-(m-isopropylbenzylidene)-D-sorbitol, 1,3:2,4-bis-O-(p-isopropylbenzylidene)-D-sorbitol, 1,3:2,4-bis-O-(o-n-propylbenzylidene)-D-sorbitol, 1,3:2,4-bis-O-(m-n-propylbenzylidene)-D-sorbitol, 1,3:2,4-bis-O-(p-n-propylbenzylidene)-D-sorbitol, 1,3:2,4-bis-O-(o-n-butylbenzylidene)-D-sorbitol, 1,3:2,4-bis-O-(m-n-butylbenzylidene)-D-sorbitol, 1,3:2,4-bis-O-(p-n-butylbenzylidene)-D-sorbitol, 1,3:2,4-bis-O-(o-t-butylbenzylidene)-D-sorbitol, 1,3:2,4-bis-O-(m-t-butylbenzylidene)-D-sorbitol, 1,3:2,4-bis-O-(p-t-butylbenzylidene)-D-sorbitol, 1,3:2,4-bis-O-(dimethylbenzylidene)-D-sorbitol, 1,3:2,4-bis-O-(2',3'-dimethylbenzylidene)-D-sorbitol, 1,3:2,4-bis-O-(2',4'-dimethylbenzylidene)-D-sorbitol, 1,3:2,4-bis-O-(2',5'-dimethylbenzylidene)-D-sorbitol, 1,3:2,4-bis-O-(2',6'-dimethylbenzylidene)-D-sorbitol, 1,3:2,4-bis-O-(3',4'-dimethylbenzylidene)-D-sorbitol, 1,3:2,4-bis-O-(3',5'-dimethylbenzylidene)-D-sorbitol, 1,3:2,4-bis-O-(2',3'-diethylbenzylidene)-D-sorbitol, 1,3:2,4-bis-O-(2',4'-diethylbenzylidene)-D-sorbitol, 1,3:2,4-bis-O-(2',5'-diethylbenzylidene)-D-sorbitol, 1,3:2,4-bis-O-(2',6'-diethylbenzylidene)-D-sorbitol, 1,3:2,4-bis-O-(3',4'-diethylbenzylidene)-D-sorbitol, 1,3:2,4-bis-O-(3',5'-diethylbenzylidene)-D-sorbitol, 1,3:2,4-bis-O-(2',4',5'-trimethylbenzylidene)-D-sorbitol, 1,3:2,4-bis-O-(3',4',5'-trimethylbenzylidene)-D-sorbitol, 1,3:2,4-bis-O-(2',4',5'-triethylbenzylidene)-D-sorbitol, 1,3:2,4-bis-O-(3',4',5'-triethylbenzylidene)-D-sorbitol, 1,3:2,4-bis-O-(o-methoxybenzylidene)-D-sorbitol, 1,3:2,4-bis-O-(m-methoxybenzylidene)-D-sorbitol, 1,3:2,4-bis-O-(p-methoxybenzylidene)-D-sorbitol, 1,3:2,4-bis-O-(o-ethoxybenzylidene)-D-sorbitol, 1,3:2,4-bis-O-(m-ethoxybenzylidene)-D-sorbitol, 1,3:2,4-bis-O-(p-ethoxybenzylidene)-D-sorbitol, 1,3:2,4-bis-O-(o-isopropoxybenzylidene)-D-sorbitol, 1,3:2,4-bis-O-(m-isopropoxybenzylidene)-D-sorbitol, 1,3:2,4-bis-O-(p-isopropoxybenzylidene)-D-sorbitol, 1,3:2,4-bis-O-(o-n-propoxybenzylidene)-D-sorbitol, 1,3:2,4-bis-O-(m-n-propoxybenzylidene)-D-sorbitol, 1,3:2,4-bis-O-(p-n-propoxybenzylidene)-D-sorbitol, 1,3:2,4-bis-O-(o-methoxycarbonylbenzylidene)-D-sorbitol, 1,3:2,4-bis-O-(m-methoxycarbonylbenzylidene)-D-sorbitol, 1,3:2,4-bis-O-(p-methoxycarbonylbenzylidene)-D-sorbitol, 1,3:2,4-bis-O-(o-ethoxycarbonylbenzylidene)-D-sorbitol, 1,3:2,4-bis-O-(m-ethoxycarbonylbenzylidene)-D-sorbitol, 1,3:2,4-bis-O-(p-ethoxycarbonylbenzylidene)-D-sorbitol, 1,3:2,4-bis-O-(o-isopropoxycarbonylbenzylidene)-D-sorbitol, 1,3:2,4-bis-O-(m-isopropoxycarbonylbenzylidene)-D-sorbitol, 1,3:2,4-bis-O-(p-isopropoxycarbonylbenzylidene)-D-sorbitol, 1,3:2,4-bis-O-(o-n-propoxycarbonylbenzylidene)-D-sorbitol, 1,3:2,4-bis-O-(m-n-propoxycarbonylbenzylidene)-D-sorbitol, 1,3:2,4-bis-O-(p-n-propoxycarbonylbenzylidene)-D-sorbitol, 1,3:2,4-bis-O-(o-fluorobenzylidene)-D-sorbitol, 1,3:2,4-bis-O-(m-fluorobenzylidene)-D-sorbitol, 1,3:2,4-bis-O-(p-fluorobenzylidene)-D-sorbitol, 1,3:2,4-bis-O-(o-chlorobenzylidene)-D-sorbitol, 1,3:2,4-bis-O-(m-chlorobenzylidene)-D-sorbitol, 1,3:2,4-bis-O-(p-chlorobenzylidene)-D-sorbitol, 1,3:2,4-bis-O-(o-bromobenzylidene)-D-sorbitol, 1,3:2,4-bis-O-(m- bromobenzylidene)-D-sorbitol, 1,3:2,4-bis-O-(p-bromobenzylidene)-D-sorbitol, 1,3-O-benzylidene-2,4-O-(p-methylbenzylidene)-D-sorbitol, 1,3-O-(p-methylbenzylidene)-2,4-O-benzylidene-D-sorbitol, 1,3-O-benzylidene-2,4-O-(p-ethylbenzylidene)-D-sorbitol, 1,3-O-(p-ethylbenzylidene)-2,4-O-benzylidene-D-sorbitol, 1,3-O-benzylidene-2,4-O-(p-chlorobenzylidene)-D-sorbitol, 1,3-O-(p-chlorobenzylidene)-2,4-O-benzylidene-D-sorbitol, 1,3-O-benzylidene-2,4-O-(2',4'-dimethylbenzylidene)-D-sorbitol, 1,3-O-(2',4'-dimethylbenzylidene)-2,4-O-benzylidene-D-sorbitol, 1,3-O-benzylidene-2,4-O-(3',4'-dimethylbenzylidene)-D-sorbitol, 1,3-O-(3',4'-dimethylbenzylidene)-2,4-O-benzylidene-D-sorbitol, 1,3-O-(p-methylbenzylidene)-2,4-O-(p-ethylbenzylidene)-D-sorbitol, 1,3-O-(p-ethylbenzylidene)-2,4-O-(p-methylbenzylidene)-D-sorbitol, 1,3-O-(p-methylbenzylidene)-2,4-O-(3',4'-dimethylbenzylidene)-D-sorbitol, 1,3-O-(3',4'-dimethylbenzylidene)-2,4-O-p-methylbenzylidene-D-sorbitol, 1,3-O-(p-ethylbenzylidene)-2,4-O-(3',4'-dimethylbenzylidene)-D-sorbitol, 1,3-O-(3',4'-dimethylbenzylidene)-2,4-O-p-ethylbenzylidene-D-sorbitol, 1,3-O-(p-methylbenzylidene)-2,4-O-(p-chlorobenzylidene)-D-sorbitol, 1,3-O-(p-chlorobenzylidene)-2,4-O-(p-methylbenzylidene)-D-sorbitol, 1,3:2,4-bis-O-(3',4'-dichlorobenzylidene)-D-sorbitol, 1,3:2,4-bis-O-benzylidene-1-methylsorbitol, 1,3:2,4-bis-O-(p-methylbenzylidene)-1-methylsorbitol, 1,3:2,4-bis-O-(p-ethylbenzylidene)-1-methylsorbitol, 1,3:2,4-bis-O-(p-n-propylbenzylidene)-1-methylsorbitol, 1,3:2,4-bis-O-(2',3'-dimethylbenzylidene)-1-methylsorbitol, 1,3:2,4-bis-O-(2',4'-dimethylbenzylidene)-1-methylsorbitol, 1,3:2,4-bis-O-(2',5'-dimethylbenzylidene)-1-methylsorbitol, 1,3:2,4-bis-O-(2',6'-dimethylbenzylidene)-1-methylsorbitol-, 1,3:2,4-bis-O-(3',4'-dimethylbenzylidene)-1-methylsorbitol, 1,3:2,4-bis-O-(3',5'-dimethylbenzylidene)-1-methylsorbitol, 1,3:2,4-bis-O-(2',3'-diethylbenzylidene)-1-methylsorbitol, 1,3:2,4-bis-O-(2',4'-diethylbenzylidene)-1-methylsorbitol, 1,3:2,4-bis-O-(2',5'-diethylbenzylidene)-1-methylsorbitol, 1,3:2,4-bis-O-(2',6'-diethylbenzylidene)-1-methylsorbitol, 1,3:2,4-bis-O-(3',4'-diethylbenzylidene)-1-methylsorbitol, 1,3:2,4-bis-O-(3',5'-diethylbenzylidene)-1-methylsorbitol, 1,3:2,4-bis-O-(3'-methyl-4'-methoxybenzylidene)-1-methylsorbitol, 1,3:2,4-bis-O-(3',4'-dichlorobenzylidene)-1-methylsorbitol, 1,3:2,4-bis-O-(p-methoxycarbonylbenzylidene)-1-methylsorbitol, 1,3:2,4-bis-O-(3'-methyl-4'-fluorobenzylidene)-1-methylsorbitol, 1,3:2,4-bis-O-(3'-bromo-4'-ethylbenzylidene)-1-methylsorbitol, 1,3:2,4-bis-O-benzylidene-1-ethylsorbitol, 1,3:2,4-bis-O-(p-methylbenzylidene)-1-ethylsorbitol, 1,3:2,4-bis-O-(p-ethylbenzylidene)-1-ethylsorbitol, 1,3:2,4-bis-O-(p-n-propylbenzylidene)-1-ethylsorbitol, 1,3:2,4-bis-O-(2',3'-dimethylbenzylidene)-1-ethylsorbitol, 1,3:2,4-bis-O-(2',4'-dimethylbenzylidene)-1-ethylsorbitol, 1,3:2,4-bis-O-(2',5'-dimethylbenzylidene)-1-ethylsorbitol, 1,3:2,4-bis-O-(2',6'-dimethylbenzylidene)-1-ethylsorbitol, 1,3:2,4-bis-O-(3',4'-dimethylbenzylidene)-1-ethylsorbitol, 1,3:2,4-bis-O-(3',5'-dimethylbenzylidene)-1-ethylsorbitol, 1,3:2,4-bis-O-(2',3'-diethylbenzylidene)-1-ethylsorbitol, 1,3:2,4-bis-O-(2',4'-diethylbenzylidene)-1-ethylsorbitol, 1,3:2,4-bis-O-(2',5'-diethylbenzylidene)-1-ethylsorbitol, 1,3:2,4-bis-O-(2',6'-diethylbenzylidene)-1-ethylsorbitol, 1,3:2,4-bis-O)-(3',4'-diethylbenzylidene)-1-ethylsorbitol, 1,3:2,4-bis-O-(3',5'-diethylbenzylidene)-1-ethylsorbitol, 1,3:2,4-bis-O)-(3'-methyl-4'-methoxybenzylidene)-1-ethylsorbitol, 1,3:2,4-bis-O-(3',4'-dichlorobenzylidene)-1-ethylsorbitol, 1,3:2,4-bis-O-(p-methoxycarbonylbenzylidene)-1-ethylsorbitol, 1,3:2,4-bis-O-(3'-methyl-4'-fluorobenzylidene)-1-ethylsorbitol, 1,3:2,4-bis-O-(3'-bromo-4'-ethylbenzylidene)-1-ethylsorbitol, 1,3:2,4-bis-O-benzylidene-1-n-propylsorbitol, 1,3:2,4-bis-O-(p-methylbenzylidene)-1-n-propylsorbitol, 1,3:2,4-bis-O-(p-ethylbenzylidene)-1-n-propylsorbitol, 1,3:2,4-bis-O-(p-n-propylbenzylidene)-1-n-propylsorbitol, 1,3:2,4-bis-O-(2',3'-dimethylbenzylidene)-1-n-propylsorbitol, 1,3:2,4-bis-O-(2',4'-dimethylbenzylidene)-1-n-propylsorbitol, 1,3:2,4-bis-O-(2',5'-dimethylbenzylidene)-1-n-propylsorbitol, 1,3:2,4-bis-O-(2',6'-dimethylbenzylidene)-1-n-propylsorbitol, 1,3:2,4-bis-O-(3',14'-dimethylbenzylidene)-1-n-propylsorbitol, 1,3:2,4-bis-C-(3',5'-dimethylbenzylidene)-1-n-propylsorbitol, 1,3:2,4-bis-O-(2',3'-diethylbenzylidene)-1-n-propylsorbitol, 1,3:2,4-bis-O-(2',4'-diethylbenzylidene)-1-n-propylsorbitol, 1,3:2,4-bis-O-(2',5'-diethylbenzylidene)-1-n-propylsorbitol, 1,3:2,4-bis-O-(2',6'-diethylbenzylidene)-1-n-propylsorbitol, 1,3:2,4-bis-O-(3',4'-diethylbenzylidene)-1-n-propylsorbitol, 1,3:2,4-bis-O-(3',5'-diethylbenzylidene)-1-n-propylsorbitol, 1,3:2,4-bis-O-(3'-methyl-4'-methoxybenzylidene)-1-n-propylsorbitol, 1,3:2,4-bis-O-(3',4'-dichlorobenzylidene)-1-n-propylsorbitol, 1,3:2,4-bis-O-(p-methoxycarbonylbenzylidene)-1-n-propylsorbitol, 1,3:2,4-bis-O-(p-ethoxycarbonylbenzylidene)-1-n-propylsorbitol, 1,3:2,4-bis-O-(p-propoxycarbonylbenzylidene)-1-n-propylsorbitol, 1,3-O-(p-n-propylbenzylidene)-2,4-O-(p-propoxybenzylidene)-1-n-propylsorbitol, 1,3-O-(p-propoxybenzylidene)-2,4-O-(p-n-propylbenzylidene)-1-n-propylsorbitol, 1,3:2,4-bis-O-(3'-methyl-4'-fluorobenzylidene)-1-n-propylsorbitol, 1,3:2,4-bis-O-(3'-bromo-4'-ethylbenzylidene)-1-n-propylsorbitol, 1,3:2,4-bis-O-(p-n-propylbenzylidene)-1-propenylsorbitol, 1,3:2,4-bis-O-(p-ethoxycarbonylbenzylidene)-1-propenylsorbitol, 1,3:2,4-bis-O-(p-propoxycarbonylbenzylidene)-1-propenylsorbitol, 1,3-O-(p-n-propylbenzylidene)-2,4-O-(p-propoxybenzylidene)-1-propenylsorbitol, 1,3-O-(p-propoxybenzylidene)-2,4-O-(p-n-propylbenzylidene)-1-propenylsorbitol, 1,3:2,4-bis-O-benzylidene-1-allylsorbitol, 1,3:2,4-bis-O-(p-methylbenzylidene)-1-allylsorbitol, 1,3:2,4-bis-O-(p-ethylbenzylidene)-1-allylsorbitol, 1,3:2,4-bis-O-(p-n-propylbenzylidene)-1-allylsorbitol, 1,3:2,4-bis-O-(2',3'-dimethylbenzylidene)-1-allylsorbitol, 1,3:2,4-bis-O-(2',4'-dimethylbenzylidene)-1-allylsorbitol, 1,3:2,4-bis-O-(2',5'-dimethylbenzylidene)-1-allylsorbitol, 1,3:2,4-bis-O-(2',6'-dimethylbenzylidene)-1-allylsorbitol, 1,3:2,4-bis-O-(3',4'-dimethylbenzylidene)-1-allylsorbitol, 1,3:2,4-bis-O-(3',5'-dimethylbenzylidene)-1-allylsorbitol, 1,3:2,4-bis-O-(2',3'-diethylbenzylidene)-1-allylsorbitol, 1,3:2,4-bis-O-(2',4'-diethylbenzylidene)-1-allylsorbitol, 1,3:2,4-bis-O-(2',5'-diethylbenzylidene)-1-allylsorbitol, 1,3:2,4-bis-O-(2',6'-diethylbenzylidene)-1-allylsorbitol, 1,3:2,4-bis-O-(3',4'-diethylbenzylidene)-1-allylsorbitol, 1,3:2,4-bis-O-(p-ethoxycarbonylbenzylidene)-1-allylsorbitol, 1,3:2,4-bis-O-(p-propoxycarbonylbenzylidene)-1-allylsorbitol, 1,3-O-(p-n-propylbenzylidene)-2,4-O-(p-propoxybenzylidene)-1-allylsorbitol, 1,3-O-(p-propoxybenzylidene)-2,4-O-(p-n-propylbenzylidene)-1-allylsorbitol, 1,3:2,4-bis-O-(3',5'-diethylbenzylidene)-1-n-propylsorbitol, 1,3:2,4-bis-O-(3'-methyl-4'-methoxybenzylidene)-1-allylsorbitol, 1,3:2,4-bis-O-(3',4'-dichlorobenzylidene)-1-allylsorbitol, 1,3:2,4-bis-O-(p-methoxycarbonylbenzylidene)-1-allylsorbitol, 1,3:2,4-bis-O-(3'-methyl-4'-fluorobenzylidene)-1-allylsorbitol, and 1,3:2,4-bis-O-(3'-bromo-4'-ethylbenzylidene)-1-allylsorbitol.

As particularly preferred embodiments, 1,3:2,4-bis-O-(p-methylbenzylidene)-D-sorbitol, 1,3:2,4-bis-O-(p-ethylbenzylidene)-D-sorbitol, 1,3:2,4-bis-O-(3',4'-dimethylbenzylidene)-D-sorbitol, and 1,3:2,4-bis-O-(p-n-propylbenzylidene)-1-propylsorbitol can be exemplified.

These diacetal compounds of the above specific embodiments may be used alone. In terms of other properties such as low-temperature processability, two or more types of diacetal compounds may be used in combination or in admixture.

In the case where diacetal compounds are used in combination or in admixture, examples of the combination thereof include a combination of 1,3:2,4-di-O-benzylidene-D-sorbitol and 1,3:2,4-bis-O-(p-methylbenzylidene)-D-sorbitol, a combination of 1,3:2,4-bis-O-(p-ethylbenzylidene)-D-sorbitol and 1,3:2,4-bis-O-(3',4'-dimethylbenzylidene)-D-sorbitol, a combination of 1,3:2,4-di-O-benzylidene-D-sorbitol and 1,3:2,4-bis-O-(3',4'-dimethylbenzylidene)-D-sorbitol, a combination of 1,3:2,4-bis-O-(p-methylbenzylidene)-D-sorbitol and 1,3:2,4-bis-O-(3',4'-dimethylbenzylidene)-D-sorbitol, a combination of 1,3:2,4-bis-O-(p-chlorobenzylidene)-D-sorbitol and 1,3:2,4-bis-O-(3',4'-dimethylbenzylidene)-D-sorbitol, and a combination of 1,3:2,4-bis-O-(3',4'-dichlorobenzylidene)-D-sorbitol and 1,3:2,4-bis-O-(3',4'-dimethylbenzylidene)-D-sorbitol.

The diacetal compounds can be easily produced by any of the production methods disclosed in, for example, JP S48-43748 B, JP S53-5165 A, JP S57-185287 A, JP H02-231488 A, and the like. Also, those presently commercially available as crystal nucleating agents for polyolefins, such as Millad 3988 and Millad NX8000 available from Milliken (US) and GEL ALL D, GEL ALL MD, and GEL ALL DXR available from New Japan Chemical Co., Ltd., may be used as they are.

Examples of the crystal nucleating agent according to the present invention other than the diacetal compounds include: carboxylic acid salt compounds such as sodium benzoate, aluminum p-tert-butyl benzoate, metal cyclohexane dicarboxylates represented by the following formula (2), metal norbornane dicarboxylates represented by the following formula (3); phosphoric acid ester salt compounds represented by the following formula (4); amide compounds represented by the following formula (5); and rosin compounds such as rosin acids represented by the following formula (6) or their metal salt compounds (e.g., alkali metal salts such as lithium, sodium, potassium, and magnesium salts).

[Chem. 4]

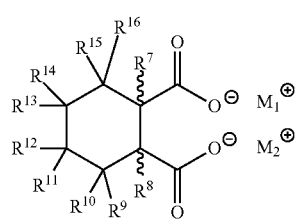

(2)

In the formula, $M_1$ and $M_2$ both represent a lithium ion or together represent single metal cations each independently selected from the group consisting of calcium, strontium, zinc, magnesium, and monobasic aluminum, $R^7$, $R^8$, $R^9$, $R^{10}$, $R^{11}$, $R^{12}$, $R^{13}$, $R^{14}$, $R^{15}$, and $R^{16}$ are the same as or different from one another and each selected from the group consisting of a hydrogen atom, a C1-C9 alkyl group (any of two vicinal (bonded to adjacent carbons) or geminal (bonded to the same carbon) alkyl groups may together form a hydrocarbon ring containing at most 6 carbon atoms), a hydroxyl group, a C1-C9 alkoxy group, a C1-C9 alkylene-oxy group, an amino group, a C1-C9 alkyl amino group, a halogen atom (fluorine, chlorine, bromine, or iodine), and a phenyl group.

[Chem. 5]

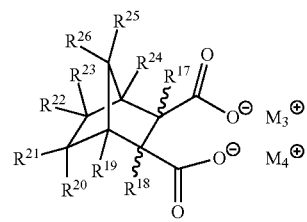

(3)

In the formula, $M_3$ and $M_4$ are the same as or different from each other and each independently selected from the group consisting of a metal cation and an organic cation or the two metal ions together form a single metal ion (divalent ion, for example, calcium), $R^{17}$, $R^{18}$, $R^{19}$, $R^{20}$, $R^{21}$, $R^{22}$, $R^{23}$, $R^{24}$, $R^{25}$, and $R^{26}$ are each independently selected from the group consisting of a hydrogen atom, a C1-C9 alkyl group, a hydroxyl group, a C1-C9 alkoxy group, a C1-C9 alkylene-oxy group, an amino group, a C1-C9 alkyl amino group, a halogen atom, a phenyl group, an alkyl phenyl group, and a geminal or vicinal carbon ring containing at most 9 carbon atoms, and the metal cation is preferably selected from the group consisting of calcium, strontium, barium, magnesium, aluminum, silver, sodium, lithium, rubidium, and potassium.

[Chem. 6]

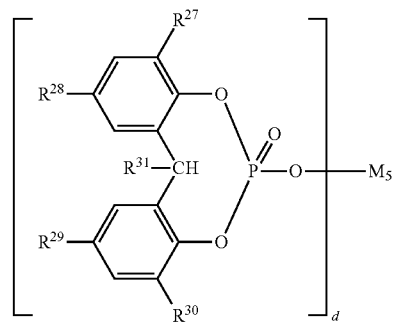

(4)

In the formula, $R^{27}$ to $R^{30}$ are the same as or different from each other and each represent a hydrogen atom or a C1-C9 alkyl group, $R^{31}$ represents a hydrogen atom or a C1-C3 alkyl group, d represents an integer of 1 or 2, and $M_5$ represents an alkali metal when d represents 1 and represents an alkaline earth metal, zinc, or hydroxy aluminum when d represents 2.

[Chem. 7]

(5)

In the formula, f represents an integer of 2 to 6, $R^{32}$ represents a C2-C18 saturated or unsaturated aliphatic polycarboxylic acid residue, a C3-C18 alicyclic polycarboxylic acid residue, or a C6-C18 aromatic polycarboxylic acid residue, 2 to 6 $R^{33}$s are the same as or different from each other and each represent a C5-C30 saturated or unsaturated aliphatic amine residue, a C5-C30 alicyclic amine residue, or a C6-C30 aromatic amine residue.

[Chem. 8]

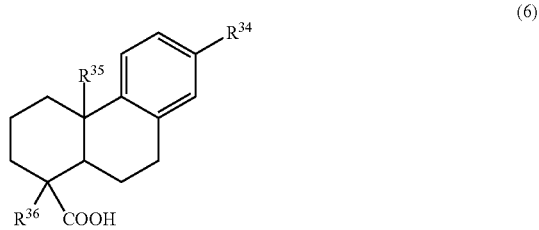

(6)

In the formula, $R^{34}$, $R^{35}$, and $R^{36}$ may be the same as or different from one another and each represent a hydrogen atom, an alkyl group, a cycloalkyl group, or an aryl group.

<Granular Crystal Nucleating Agent for Polyolefin Resins>

The crystal nucleating agent for polyolefin resins of the present invention is preferably a blend containing an organic acid monoglyceride as a component (B) and an organic compound having a melting point of 100° C. or higher as a component (C), wherein the component (A) accounts for 60 to 80% by weight of the crystal nucleating agent for polyolefin resins, the component (B) accounts for 10 to 30% by weight of the crystal nucleating agent for polyolefin resins, the component (B) and the component (C) in total account for 20 to 40% by weight of the crystal nucleating agent for polyolefin resins, and the component (B) accounts for 30 to 80% by weight of the total amount of the component (B) and the component (C), and the blend is prepared by heat-mixing while controlling the powder temperature at a temperature of not lower than the melting point of the component (B) and not higher than the melting point of the component (C). Hereinafter, the blend containing the component (A), the component (B), and the component (C) is also referred to as a "granular crystal nucleating agent for polyolefin resins".

The present inventors found out that adding a specific compound having a binder effect at a specific ratio and mixing under stirring under specific conditions enable production of a granular crystal nucleating agent for polyolefin resins using a small amount of the specific compound. They found out that the obtained granular crystal nucleating agent for polyolefin resins does not cause problems such as caking and has excellent dispersibility or solubility in resin as well as remarkably improved fluidity. They also found out that a polyolefin resin composition containing the granular crystal nucleating agent for polyolefin resins and a molded article thereof have very excellent transparency.

The "heat-mixing" means mixing the components under heat. The components may be mixed by any method as long as the effect of the present invention can be obtained. For example, the components are preferably mixed by stirring (mixing under stirring). That is, granulation with mixing under stirring (stirring granulation) is particularly recommended as a method for producing the granular crystal nucleating agent for polyolefin resins. The granular crystal nucleating agent for polyolefin resins obtained by stirring granulation under heat (heat stirring granulation product) is particularly advantageous in performance such as fluidity. The powder temperature in heat-mixing is preferably 50° C. to 120° C.

It is difficult to determine the reason why the above effect is obtained in the present invention. Presumably, as a result of preparation under the above conditions, the completely melted component (B) uniformly penetrates the coagulated particles of the component (A) to exhibit an excellent binder effect, and the binder effect of the component (B) is adjusted by the incompletely melted component (C) coexisting with the component (B). In other words, while use of the component (B) alone poses the concern of the commonly known reduction in the dispersibility due to granulation, the coexistence of the component (C) presumably adjusts the binder effect, thus eliminating the concern of reduction in the dispersibility. In addition, the coexistence of the component (C) having a high melting point presumably also reduces concerns such as caking.

In the granular crystal nucleating agent for polyolefin resins, preferably, the granular crystal nucleating agent for polyolefin resins serves as a core, and particles of a raw material crystal nucleating agent (b) as a component (D) are adhered to the core. In some applications, problems such as caking may occur even under the above conditions due to the component (B) having a binder effect. In such a case, the problems such as caking can be suitably solved by adding powder of the component (D) obtained by a conventional method to the obtained granular crystal nucleating agent for polyolefin resins and mixing under stirring while controlling the powder temperature at a temperature of not lower than the melting point of the component (B) and lower than the powder temperature in the preparation of the core in the first stage. Caking in a resin additive composition is generally considered to be caused by a component having a low melting point, that is, the component (B). The most effective method is thus to reduce the amount of the component. However, such a method leads to insufficient granulation, and does not sufficiently achieve the originally intended improvement of properties such as the fluidity or dispersibility, making it difficult to satisfy the recent strict requirements. The present inventors made various studies on the method for solving problems such as caking while maintaining the fluidity or dispersibility. They found out that although the reason is unclear, the above structure can suitably solve problems such as caking. In this case, although visual confirmation is difficult due to the unclear boundaries, many of the particles of the component (D) are presumably adhered to the surface of the blend. The component (D) being in such a state is seemingly particularly important for reducing problems such as caking.

Examples of the component (D) include diacetal compounds, carboxylic acid salt compounds, phosphoric acid ester salt compounds, amide compounds, and rosin compounds. The component (D) may be the same as or different from the component (A), and is preferably the same as the component (A). The amount of the component (D) adhered is preferably 1 to 20 parts by weight, more preferably 1 to 15 parts by weight relative to 100 parts by weight of the granular crystal nucleating agent for polyolefin resins as the core portion. With the amount of the component (D) adhered within the above range, problems such as caking can be suitably solved while maintaining the fluidity and dispersibility.

In the granular crystal nucleating agent for polyolefin resins, the component (A) and the component (D) may be in any form. The components are preferably in the form of powder having an average particle size of 0.01 to 15 μm, more preferably 0.1 to 10 μm. The component (A) and the component (D) having an average particle size of 0.01 μm or greater tend to facilitate granulation. The component (A)

and the component (D) having an average particle size of 15 μm or smaller tend to positively affect the dispersibility or solubility in polyolefin resins of the granular crystal nucleating agent for polyolefin resins.

The laser diffraction particle size distribution measurement herein can be performed using a common device by a common method under common conditions. For example, using a laser diffraction particle size distribution analyzer ("Mastersizer 3000" available from Malvern Instruments), a sample is dispersed in an aqueous solution containing a surfactant as a dispersant by sufficient mixing under stirring in a wet measurement cell, the resulting mixture is further stirred and circulated in the analyzer and uniformly dispersed in the analyzer under irradiation with ultrasonic wave, and the particle size distribution of the sample can be measured under irradiation with ultrasonic wave. The average particle size, that is, the volume-based cumulative 50% particle size (median size: d50) can be determined from the obtained particle size distribution.

It is important that the granular crystal nucleating agent for polyolefin resins is granular from the standpoint of the fluidity. In sieve analysis under the conditions in conformity with JIS K 0069 (1992), the proportion of a residue on a JIS test sieve with an aperture of 600 μm is preferably 10% by weight or higher, more preferably 20% by weight or higher to the total weight of the sample used in the analysis. Here, a stirring granulation method is most advantageous for adjustment of the particle size of the granular crystal nucleating agent for polyolefin resins using a small amount of the component (B) and component (C).

The sieve analysis can be performed in conformity with JIS K0069 (1992) using a general-purpose sieve conforming to the JIS standard. Specifically, sieve analysis is performed under the conditions in conformity with section 6.1 of JIS K0069 (1992) to measure the weight of a residue on a JIS test sieve with an aperture of 600 μm and determine the proportion of the residue to the total weight of the sample used in the analysis.

The component (B) is not particularly limited, but is preferably a monoglyceride of a fatty acid that may have at least one hydroxy group in a molecule. The fatty acid is more preferably a C12-C24 saturated fatty acid, still more preferably C14-C22 saturated fatty acid.

Examples of the component (B) include: monoglycerides of saturated fatty acids such as lauric acid, myristic acid, palmitic acid, stearic acid, nonadecanoic acid, arachidic acid, behenic acid, and lignoceric acid; monoglycerides of unsaturated fatty acids such as palmitoleic acid, oleic acid, elaidic acid, gadoleic acid, erucic acid, nervonic acid, linoleic acid, eicosadienoic acid, docosadienoic acid, linolenic acid, stearidonic acid, arachidonic acid, eicosapentaenoic acid, docosahexaenoic acid, and undecylenic acid; and glycerides of fatty acids having a branched chain or a substituent such as isostearic acid, ricinoleic acid, 12-hydroxystearic acid, 9-hydroxystearic acid, 10-hydroxystearic acid, and hydrogenated castor oil fatty acid (fatty acid having a small amount of stearic acid and palmitic acid in addition to 12-hydroxystearic acid).

Particularly preferred among the organic acid monoglycerides are glycerol monostearate, glycerol monobehenate, and 12-hydroxystearic acid monoglyceride, with glycerol monostearate being most preferred.

The component (C) is not particularly limited. Organic compounds having any structure can be used as long as they have a melting point of 100° C. or higher. The component (C) is preferably one or two or more compounds selected from the group consisting of an alkali or alkaline earth metal salt or a transition metal salt of a C14-C22 saturated fatty acid, a hindered phenol compound, and a phosphorous acid ester compound.

Examples of the alkali or alkaline earth metal salt of a C14-C22 saturated fatty acid include alkali metal salts (e.g., lithium, sodium potassium, and cesium salts), alkali earth metal salts (e.g., calcium, magnesium, and barium salts), and transition metal salts (e.g., zinc salts) of saturated fatty acids such as myristic acid, palmitic acid, stearic acid, nonadecanoic acid, arachidic acid, behenic acid, and lignoceric acid and saturated fatty acids having a branched chain or a substituent such as isostearic acid, ricinoleic acid, 12-hydroxystearic acid, 9-hydroxystearic acid, 10-hydroxystearic acid, and hydrogenated castor oil fatty acid (fatty acid having a small amount of stearic acid and palmitic acid in addition to 12-hydroxystearic acid). More preferred among these are calcium salts, magnesium salts, and zinc salts of stearic acid, behenic acid, and 12-hydroxystearic acid.

Examples of the hindered phenol compound include 2,6-diphenyl-4-octadecyloxyphenol, 4,4'-methylenebis(2,6-di-t-butylphenol), 2-[1-(2-hydroxy-3,5-di-t-pentylphenyl)ethyl]-4,6-di-t-pentylphenyl acrylate, triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 3,9-bis[2-[3-(3-t-butyl-5-methyl-4-hydroxyphenyl)-propionyloxy]-1,1-dimethylethyl]-2,4,8,10-tetraoxaspiro[5.5]undecane, 1,1,3-tris(2-methyl-5-t-butyl-4-hydroxyphenyl)butane, 2,4,6-tris(3,5-di-t-butyl-4-hydroxybenzyl)mesitylene, tetrakis-[methylene-3-(3',5'-di-t-butyl-4'-hydroxyphenyl)propionate]methane, bis[3,3-bis-(3'-t-butyl-4'-hydroxyphenyl)butyric acid] ethylene glycol ester, 2,6-bis(2-hydroxy-3-t-butyl-5-methylbenzyl)-4-methylphenol, bis[2-t-butyl-4-methyl-6-(2-hydroxy-3-t-butyl-5-methylbenzyl)phenyl]terephthalate, α-tocopherol, β-tocopherol, γ-tocopherol, α-tocotrienol, β-tocotrienol, γ-tocotrienol, dodecyl gallate, hexadecyl gallate, stearyl gallate, octyl 3-(4-hydroxy-3,5-diisopropylphenyl)propionate, 2,4-dimethyl-6-(1-methylpentadecyl)-phenol, 2,2'-methylenebis(4-methyl-6-t-butylphenol), 2,2'-methylenebis(4-ethyl-6-t-butylphenol), 4,4'-butylidenebis(3-methyl-6-t-butylphenol), nordihydroguaiaretic acid, 2,2'-methylenebis[4-methyl-6-nonylphenol], 2,2'-methylenebis[6-(1-methylcyclohexyl)-4-methylphenol], 2,2'-[(2-hydroxy-5-methylbenzene-1,3-diyl)dimethanediyl]bis(4-methyl-6-nonylphenol), 2,2'-thiodiethylbis[3-(3,5-di-t-butyl-4-hydroxyphenyl)propionate], 4,4'-thiobis(2-t-butyl-5-methyl phenol), 2-hydroxy-4-n-octyloxybenzophenone, 2-(2'-hydroxy-3'-t-butyl-5'-methylphenyl)5-chlorobenzotriazole, 2-t-butyl-6-(3-t-butyl-2-hydroxy-5-methylbenzyl)-4-methylphenylacrylate, N,N'-(1,6-hexanediyl)bis[3-(3,5-di-t-butyl-4-hydroxyphenyl)propionamide], 1,3,5-tris(3,5-di-t-butyl-4-hydroxybenzyl)isocyanurate, 1,3,5-tris(4-t-butyl-3-hydroxy-2,6-dimethylbenzyl)isocyanurate, 2,2'-ethylidenebis(4,6-di-t-butylphenol), 2,2'-ethylidenebis(4-s-butyl-6-t-butylphenol), 1,3,5-tris[(3,5-di-t-butyl-4-hydroxyphenyl)propionyloxyethyl]isocyanurate, and curcumin.

Recommended compounds among the above compounds include 4,4'-methylenebis(2,6-di-t-butylphenol), 3,9-bis[2-[3-(3-t-butyl-5-methyl-4-hydroxyphenyl)-propionyloxy]-1,1-dimethyl ethyl]-2,4,8,10-tetraoxaspiro[5.5]undecane, 1,1,3-tris(2-methyl-5-t-butyl-4-hydroxyphenyl)butane, 2,4,6-tris(3,5-di-t-butyl-4-hydroxybenzyl)mesitylene, tetrakis-[methylene-3-(3',5'-di-t-butyl-4'-hydroxyphenyl) propionate]methane, 2,2'-thiodiethylbis[3-(3,5-di-t-butyl-4-hydroxyphenyl)propionate], N,N'-(1,6-hexanediyl)bis[3-(3,5-di-t-butyl-4-hydroxyphenyl)propionamide], and 1,3,5-tris (3,5-di-t-butyl-4-hydroxybenzyl)isocyanurate. More preferred compounds among these include 3,9-bis[2-[3-(3-t-butyl-5-methyl-4-hydroxyphenyl)-propionyloxy]-1,1-dimethyl ethyl]-2,4,8,10-tetraoxaspiro[5.5]undecane, 1,1,3-tris(2-methyl-5-t-butyl-4-hydroxyphenyl)butane, tetrakis-[methylene-3-(3',5'-di-t-butyl-4'-hydroxyphenyl)propionate]methane, 2,6-bis(2-hydroxy-3-t-butyl-5-methylbenzyl)-4-methylphenol, and 1,3,5-tris(4-t-butyl-3-hydroxy-2,6-dimethylbenzyl)isocyanurate. Still more preferred is tetrakis-[methylene-3-(3',5'-di-t-butyl-4'-hydroxyphenyl)propionate]methane.

Examples of the phosphorous acid ester compound include triphenyl phosphite, trisnonyl phenyl phosphite, tricresyl phosphite, triethyl phosphite, tris(2-ethylhexyl) phosphite, tridecyl phosphite, trilauryl phosphite, tris(tridecyl) phosphite, trioleyl phosphite, diphenyl mono(2-ethylhexyl) phosphite, diphenyl monodecyl phosphite, diphenyl mono(tridecyl) phosphite, trilauryl trithiophosphite, tetraphenyl dipropylene glycol diphosphite, a mixture of tetraphenyl(tetratridecyl)pentaerythritol tetraphosphite and bis(2-ethylhexyl) phthalate, tetra(C12-C15 alkyl)-4,4'-isopropylidene diphenyl diphosphite, a mixture of bis(tridecyl) pentaerythritol diphosphite and bis(nonylphenyl) pentaerythritol diphosphite, bis(decyl) pentaerythritol diphosphite, bis(tridecyl) pentaerythritol diphosphite, tristearyl phosphite, distearyl pentaerythritol diphosphite, tris(2,4-di-t-butylphenyl) phosphite, hydrogenated bisphenol A-pentaerythritol phosphite polymer, and hydrogenated bisphenol A phosphite polymer. More preferred among these are/is pentaerythritol tetrakis[3-(3,5-di-t-butyl-4-hydroxyphenyl)propionate] and/or tris(2,4-di-t-butylphenyl) phosphite. Still more preferred is tris(2,4-di-t-butylphenyl) phosphite and particularly preferred is pentaerythritol tetrakis[3-(3,5-di-t-butyl-4-hydroxyphenyl)propionate].

The component (A) more preferably accounts for 65 to 75% by weight of the granular crystal nucleating agent for polyolefin resins. The component (B) more preferably accounts for 10 to 30% by weight, still more preferably 13 to 25% by weight. The component (B) and the component (C) in total more preferably account for 20 to 40% by weight, still more preferably 25 to 35% by weight. The component (B) more preferably accounts for 35 to 75% by weight of the total amount of the component (B) and the component (C). With the proportions of the components in the above ranges, granulation can be facilitated, so that the fluidity can be suitably improved.

<Granular or Powdery Crystal Nucleating Agent for Polyolefin Resins>

The crystal nucleating agent for polyolefin resins of the present invention is preferably a blend including a sulfuric acid ester salt and/or a sulfonic acid salt as a component (E) and a higher fatty acid as a component (F), wherein the blend contains the component (E) in an amount of 0.1 to 5 parts by weight relative to 100 parts by weight of the component (A), and the component (F) in an amount of 0.3 to 5 parts by weight relative to 100 parts by weight of the component (A), and has a ratio of the component (E) to the component (F), (E)/(F), in a range of 1/3 to 4/1, and the blend is obtained by preparing a mixture of the component (A) swelled with an organic solvent, the component (E) dissolved in the organic solvent, and the component (F) in a powdery or granular form and removing the organic solvent from the mixture. Hereinafter the blend containing the component (A), the component (E), and the component (F) is also referred to as a "granular or powdery crystal nucleating agent for polyolefin resins".

The granular or powdery crystal nucleating agent for polyolefin resins can be easily obtained by swelling, with a specific solvent, the component (A) which is a commercially available product or obtained by a conventional production process, adding simultaneously or sequentially the component (E) swelled with an organic solvent and the component (F) in a powdery or granular form, and mixing the components. These steps can be incorporated into the production process, for example, before or after a drying step.

In the granular or powdery crystal nucleating agent for polyolefin resins, the state of each component in the mixing is very important for improvement of the fluidity. To improve the dispersibility or solubility, it is important that the component (E) and the component (F) are present as uniformly as possible between the fine particles present in the aggregates constituting the particles of the component (A). Conventionally recommended methods to achieve this include a method of putting all the components in a large amount of organic solvent and heat-mixing them for a long time, or dissolving the component (E) and the component (F) in an organic solvent and adding the solution to the component (A) (Patent Literature 3). Merely carrying out the method tends to improve the fluidity as the method increases the bulk density. The present inventors, however, considered that more improvement is needed in view of the recent demand for further improved productivity. For this purpose, they found out that production by the above process according to the present invention surprisingly improves the fluidity to an extent that cannot be explained by an increase in bulk density alone.

Despite various analyses, the present inventors have yet to clarify the reason why only the above system significantly improves the fluidity. However, the analysis results allow the following deduction. When the component (E) dissolved in an organic solvent is added to the component (A) swelled with an organic solvent, the component (E) quickly penetrates between the fine particles of the component (A) so that the component (E) can be uniformly present between the fine particles of the component (A). On the other hand, the component (F) added in a powdery or granular form without being dissolved into an organic solvent slowly penetrates between the fine particles of the component (A), and thus is considered to be mostly present near the surfaces of the aggregates constituting the particles of the component (A). The component (F) present near the surfaces of the aggregates presumably greatly contributes to the fluidity-improving effect.

The "swelling" typically means an increase in volume caused by a solvent penetrating into a solid while maintaining the shape of the solid. Similarly, the state where a solvent has uniformly penetrated between the fine particles present in the aggregates constituting the particles of the component (A) is referred to as a swelled state. Even if partially dissolved, the solid is regarded as being in a swelled state as long as the shape of the solid is maintained. The swelled state is known to make it easy for additives or the like to penetrate into the particles. This tendency is particularly noticeable when the additives or the like are added in the state of being dissolved in the same solvent as that used for the swelling. Typically, to achieve the swelled state, the dissolving power and compatibility of the solvent are important: a solvent with too high dissolving power causes the solid to reach a dissolved state past the swelled state; and a solvent with too low compatibility does not penetrate into the solid, failing to give the swelled state.

In the granular or powdery crystal nucleating agent for polyolefin resins, the powder of the component (A) may have any shape. Preferably, the powder of the component (A) has an average particle size of 0.01 to 15 µm, more preferably 0.1 to 10 µm as determined by laser diffraction particle size distribution measurement. The component (A) having an average particle size of 0.01 µm or greater tends to lead to excellent workability. The component (A) having an average particle size of 15 µm or smaller tends to positively affect the dispersibility or solubility in polyolefin resins of the granular or powdery crystal nucleating agent for polyolefin resins.

Although the granular or powdery crystal nucleating agent for polyolefin resins in the obtained powdery form can sufficiently improve the fluidity, the obtained powder may be granulated by a conventionally known method when further improvement of the fluidity is desired. In this case, the component (E) and component (F) added serve as binders to not only promote granulation, but also to advantageously suppress reduction in the dispersibility or solubility of the obtained granulation product in resin.

In the case where the granular or powdery crystal nucleating agent for polyolefin resins is powdery, it preferably has a shape having an average particle size of 0.1 to 30 µm, more preferably 0.5 to 20 µm as determined by laser diffraction particle size distribution measurement. In the case where the granular or powdery crystal nucleating agent for polyolefin resins is granular, it preferably has a shape having an average particle size of 5 to 100 µm, more preferably 10 to 50 µm. Here, the crystal nucleating agent for polyolefin resins does not necessarily have these shapes as long as the effect of the present invention is exerted.

The component (E) is not particularly limited. Sulfates and sulfonates having any structure can be used. The component (E) is preferably one or two or more compounds selected from the group consisting of a C8-C24 alkyl sulfate, a polyoxyethylene C8-C24 alkyl ether sulfate having an average number of moles of ethylene oxide (EO) added of 1 to 8, and a C6-C20 linear alkyl benzene sulfonate. The sulfates and sulfonates are each preferably a sodium salt, a potassium salt, a lithium salt, an ammonium salt, or a triethanolamine salt.

Examples of the C8-C24 alkyl sulfuric acid ester salt include sodium n-octyl sulfate, sodium 2-ethylhexyl sulfate, sodium n-decyl sulfate, sodium lauryl sulfate, sodium myristyl sulfate, sodium palmityl sulfate, sodium stearyl sulfate, sodium arachidyl sulfate, sodium behenyl sulfate, sodium isostearyl sulfate, sodium C12-C14 alkyl sulfate, coconut oil sodium alkyl sulfate, palm oil sodium alkyl sulfate, palm kernel oil sodium alkyl sulfate, soybean oil sodium alkyl sulfate, potassium n-octyl sulfate, potassium 2-ethylhexyl sulfate, potassium n-decyl sulfate, potassium lauryl sulfate, potassium myristyl sulfate, potassium palmityl sulfate, potassium stearyl sulfate, potassium arachidyl sulfate, potassium behenyl sulfate, potassium isostearyl sulfate, potassium C12-C14 alkyl sulfate, coconut oil potassium alkyl sulfate, palm oil potassium alkyl sulfate, palm kernel oil potassium alkyl sulfate, soybean oil potassium alkyl sulfate, ammonium n-octyl sulfate, ammonium 2-ethylhexyl sulfate, ammonium n-decyl sulfate, ammonium lauryl sulfate, ammonium myristyl sulfate, ammonium palmityl sulfate, ammonium stearyl sulfate, ammonium arachidyl sulfate, ammonium behenyl sulfate, ammonium isostearyl sulfate, ammonium C12-C14 alkyl sulfate, coconut oil ammonium alkyl sulfate, palm oil ammonium alkyl sulfate, palm kernel oil ammonium alkyl sulfate, and soybean oil ammonium alkyl sulfate. More preferred among these are sodium lauryl sulfate, potassium lauryl sulfate, ammonium lauryl sulfate, sodium C12-C14 alkyl sulfate, potassium C12-C14 alkyl sulfate, and ammonium C12-C14 alkyl sulfate. Still more preferred are sodium lauryl sulfate and sodium C12-C14 alkyl sulfate.

Examples of the polyoxyethylene C8-C22 alkyl ether sulfuric acid ester salt having an average number of moles of the oxyethylene group (EO) added of 1 to 5 include sodium polyoxyethylene (average number of moles of the oxyethylene group (EO) added: 1 to 5)-n-octyl ether sulfate, sodium polyoxyethylene (average number of moles of EO added: 1 to 5)-2-ethylhexyl ether sulfate, sodium polyoxyethylene (average number of moles of EO added: 1 to 5)-n-decyl ether sulfate, sodium polyoxyethylene (average number of moles of EO added: 1 to 5) lauryl ether sulfate, sodium polyoxyethylene (average number of moles of EO added: 1 to 5) myristyl ether sulfate, sodium polyoxyethylene (average number of moles of EO added: 1 to 5) palmityl ether sulfate, sodium polyoxyethylene (average number of moles of EO added: 1 to 5) stearyl ether sulfate, sodium polyoxyethylene (average number of moles of EO added: 1 to 5) arachidyl ether sulfate, sodium polyoxyethylene (average number of moles of EO added: 1 to 5) behenyl ether sulfate, sodium polyoxyethylene (average number of moles of EO added: 1 to 5) isostearyl ether sulfate, sodium polyoxyethylene (average number of moles of EO added: 1 to 5) coconut oil alkyl ether sulfate, sodium polyoxyethylene (average number of moles of EO added: 1 to 5) palm oil alkyl ether sulfate, sodium polyoxyethylene (average number of moles of EO added: 1 to 5) palm kernel oil alkyl ether sulfate, sodium polyoxyethylene (average number of moles of EO added: 1 to 5) soybean oil alkyl ether sulfate, potassium polyoxyethylene (average number of moles of EO added: 1 to 5)-n-octyl ether sulfate, potassium polyoxyethylene (average number of moles of EO added: 1 to 5)-2-ethylhexyl ether sulfate, potassium polyoxyethylene (average number of moles of EO added: 1 to 5)-n-decyl ether sulfate, potassium polyoxyethylene (average number of moles of EO added: 1 to 5) lauryl ether sulfate, potassium polyoxyethylene (average number of moles of EO added: 1 to 5) myristyl ether sulfate, potassium polyoxyethylene (average number of moles of EO added: 1 to 5) palmityl ether sulfate, potassium polyoxyethylene (average number of moles of EO added: 1 to 5) stearyl ether sulfate, potassium polyoxyethylene (average number of moles of EO added: 1 to 5) arachidyl ether sulfate, potassium polyoxyethylene (average number of moles of EO added: 1 to 5) behenyl ether sulfate, potassium polyoxyethylene (average number of moles of EO added: 1 to 5) isostearyl ether sulfate, potassium polyoxyethylene (average number of moles of EO added: 1 to 5) coconut oil alkyl ether sulfate, potassium polyoxyethylene (average number of moles of EO added: 1 to 5) palm oil alkyl ether sulfate, potassium polyoxyethylene (average number of moles of EO added: 1 to 5) palm kernel oil alkyl ether sulfate, and potassium polyoxyethylene (average number of moles of EO added: 1 to 5) soybean oil alkyl ether sulfate. More preferred among these are sodium polyoxyethylene (average number of moles of EO added: 1 to 5) lauryl ether sulfate, potassium polyoxyethylene (average number of moles of EO added: 1 to 5) lauryl ether sulfate, and ammonium polyoxyethylene (average number of moles of EO added: 1 to 5) lauryl ether sulfate. Still more preferred is sodium polyoxyethylene (average number of moles of EO added: 1 to 5) lauryl ether sulfate.

Examples of the C6-C20 linear alkyl benzene sulfonic acid salt include sodium decyl benzene sulfonate, sodium undecyl benzene sulfonate, sodium dodecyl benzene sulfonate, sodium tridecyl benzene sulfonate, sodium tetradecyl benzene sulfonate, sodium C6-C14 linear alkyl benzene sulfonate, sodium C6-C16 linear alkyl benzene sulfonate, sodium C6-C20 linear alkyl benzene sulfonate, sodium C10-C16 linear alkyl benzene sulfonate, sodium C10-C13 linear alkyl benzene sulfonate, sodium C10-C14 linear alkyl benzene sulfonate, potassium decyl benzene sulfonate, potassium undecyl benzene sulfonate, potassium dodecyl benzene sulfonate, potassium tridecyl benzene sulfonate, potassium tetradecyl benzene sulfonate, potassium C6-C14 linear alkyl benzene sulfonate, potassium C6-C16 linear alkyl benzene sulfonate, potassium C6-C20 linear alkyl benzene sulfonate, potassium C10-C16 linear alkyl benzene sulfonate, potassium C10-C13 linear alkyl benzene sulfonate, potassium C10-C14 linear alkyl benzene sulfonate, and ammonium dodecyl benzene sulfonate. More preferred among these are sodium dodecyl benzene sulfonate, potassium dodecyl benzene sulfonate, and ammonium dodecyl benzene sulfonate. Still more preferred is sodium dodecyl benzene sulfonate.

The component (F) is not particularly limited. The component (F) is preferably a C12-C24 saturated fatty acid that may have at least one hydroxy group in a molecule, more preferably a C18-C22 saturated fatty acid that may have at least one hydroxy group in a molecule.

Specific examples thereof include capric acid, lauric acid, myristic acid, pentadecylic acid, palmitic acid, 10-hydroxypalmitic acid, 11-hydroxypalmitic acid, palmitoleic acid, margaric acid, stearic acid, 10-hydroxystearic acid, 12-hydroxystearic acid, oleic acid, vaccenic acid, linoleic acid, linolenic acid, eleostearic acid, arachidic acid, eicosadienoic acid, mead acid, arachidonic acid, behenic acid, lignoceric acid, and nervonic acid. More preferred among these are lauric acid, myristic acid, palmitic acid, stearic acid, 12-hydroxystearic acid, and behenic acid. Particularly preferred are stearic acid, 12-hydroxystearic acid, and behenic acid. The component (E) is most preferably stearic acid and/or 12-hydroxystearic acid.

The amount of the component (E) is preferably 0.1 to 5 parts by weight, more preferably 0.2 to 4 parts by weight relative to 100 parts by weight of the component (A). With the amount of the component (E) within the range, the fluidity is sufficiently improved without reducing the transparency.

The amount of the component (F) is preferably 0.3 to 5 parts by weight, more preferably 0.3 to 3 parts by weight relative to 100 parts by weight of the component (A). With the amount of the component (F) within the range, the fluidity is sufficiently improved without reducing the transparency.

The ratio of the component (E) to the component (F), (E)/(F), is preferably 1/3 to 4/1, more preferably 1/2.5 to 2.5/1. With the ratio of the component (E) to the component (F) within the range, the fluidity can be suitably improved, and a molded article having excellent transparency can be suitably obtained.

<Production of Crystal Nucleating Agent for Polyolefin Resins>

The present invention also relates to a method for producing a crystal nucleating agent for polyolefin resins, including (i) subjecting a raw material crystal nucleating agent (a) as a component (A), an organic acid monoglyceride as a component (B), and an organic compound having a melting point of 100° C. or higher as a component (C) to stirring granulation while controlling the powder temperature at a temperature of not lower than the melting point of the component (B) and not higher than the melting point of the component (C). Here, the production method is not particularly limited as long as the method provides a desired performance.

The method preferably includes (ii) adding a raw material crystal nucleating agent (b) as a component (D) to the crystal nucleating agent for polyolefin resins obtained in the step (i) and heat-mixing the component (D) and the crystal nucleating agent for polyolefin resins while controlling the powder temperature at a temperature of not lower than the melting point of the component (C) and lower than the powder temperature in the step (i).

The stirring granulation in the step (i) is not particularly limited as long as granulation can be performed with stirring. The stirring granulation can be performed using a general-purpose stirring granulator capable of heating and equipped with a stirring blade inside a stirring vessel. Representative stirring granulators include tumble stirring granulators (e.g., a high speed mixer), high speed stirring granulators (e.g., a Henschel mixer), vertical mixers such as a vertical granulator, Pharma Matrix, Super Mixer, GRAL, a Schugi mixer, High Speeder, and New Speed Kneader, and horizontal mixers such as a Loedige mixer, SPARTANRYUZER, and a pin mixer. Preferred among these are tumble stirring granulators and high speed stirring granulators.

The heat-mixing in the step (ii) is not particularly limited as long as mixing can be performed under heat. The heat-mixing may be performed with a general-purpose stirring mixer such as a universal mixer, but from the standpoint of productivity, using the same stirring granulator as that used in the step (i) is efficient and preferred.

The components in the step (i) may be added by any method. For example, the three components may be simultaneously added and then subjected to stirring granulation under heat. Alternatively, the component (A) alone is added in advance, and during stirring the component (A), the rest components, the component (B) and the component (C), may be added all at once or sequentially to perform stirring granulation.

The "powder temperature" herein means the actual temperature of powder that is a powdery or granular mixture during stirring granulation, mixing under stirring, or heat-mixing. For example, the powder temperature can be easily measured by placing or inserting a thermometer in a device used in stirring granulation, mixing under stirring, or heat-mixing.

An exemplary method for controlling the powder temperature includes raising the temperature by passing a heating medium through a heating means provided in the stirring device, specifically the jacket of the stirring device, then adjusting heating by the heating medium or shear heating, and if the shear heating is significant, adjusting cooling by a cooling medium, while measuring the actual powder temperature with a thermometer placed in the device.

The control range of the powder temperature depends on the types of the component (B) and the component (C). Specifically, the powder temperature in the step (i) is preferably not lower than the melting point of the component (B) and not higher than the melting point of the component (C), more preferably within the range of the melting point of the component (B)+10° C. to the melting point of the component (C)−10° C. The powder temperature in the step (ii) is preferably within the range of the melting point of the component (B) to the melting point of the component (B)+50° C., and lower than the heating temperature in the step (i).

The present invention also relates to a method for producing a crystal nucleating agent for polyolefin resins, including mixing a raw material crystal nucleating agent (a) as a component (A) swelled with an organic solvent, 0.1 to 5 parts by weight of a sulfuric acid ester salt and/or a sulfonic acid salt as a component (E) dissolved in the organic solvent relative to 100 parts by weight of the component (A), and 0.3 to 5 parts by weight of a higher fatty acid as a component (F) in a powdery or granular form relative to 100 parts by weight of the component (A) to a ratio of the component (E) to the component (F), (E)/(F), of 1/3 to 4/1, followed by removing the organic solvent. Here, the production method is not particularly limited as long as the method provides a desired performance.

The production method preferably includes the following steps:

(I) adding an organic solvent to the component (A) and heat-stirring the mixture to swell the component (A);

(II) adding the component (E) dissolved in an organic solvent to the swelled component (A) obtained in the step (I) and further stirring the mixture;

(III) adding the component (F) in a powdery or granular form and stirring the mixture; and (IV) removing the organic solvent after heat-mixing for a predetermined time.

The steps (II) and (ITT) can be performed at the same time in the case where a desired performance can be obtained.

The organic solvent used in the step (I) is not particularly limited as long as it can swell the component (A) and dissolve the component (E). Preferred examples of the organic solvent include C1-C4 lower alcohol solvents such as methanol, ethanol, propanol, and butanol, hydrocarbon solvents such as hexane and cyclohexane, aromatic hydrocarbon solvents such as toluene and xylene, and ketone solvents such as acetone and methyl ethyl ketone. More preferred among these is C1-C4 lower alcohol solvents. Still more preferred are methanol and ethanol. Particularly preferred is methanol. The organic solvents may be used alone, or a plurality of organic solvents may be used. Furthermore, for example, a lower alcohol solvent or a ketone solvent mixed with a small amount a hydrocarbon solvent, water, or the like may be used.

The temperature and time in the step (I) vary depending on the type of the component (A) and the type of the organic solvent used. For example, when the organic solvent is methanol, usually, the component (A) can be sufficiently swelled by performing the step (I) at 40° C. to 60° C. for about one to three hours.

The organic solvent to dissolve the component (E) in the step (II) may be any organic solvent in which the component (E) is easily dissolved. The organic solvent is preferably the same as that of the step (T).

The temperature and time in the step (II) and the step (III) vary depending on the types of the component (A), the component (E), and the component (F) as in the step (I). For example, when the organic solvent is methanol, usually, the granular or powdery crystal nucleating agent for polyolefin resins is suitably obtained by performing the steps each at 40° C. to 60° C. for about one to five hours.

The method for performing the step (IV) varies depending on the type of the organic solvent. For example, the step (IV) may be performed by any conventionally known method such as filtration, centrifugation, or evaporation drying. The most preferred is evaporation drying using a low-boiling-point organic solvent.

In evaporation drying, an effective method to prevent coloration or the like is to mix a low-boiling-point organic solvent such as methanol with a solvent having a higher boiling point than the organic solvent. In addition, use of a solvent in which the component (F) does not dissolve, such as water, is expected to further improve the fluidity.

<Method for Improving the Fluidity of a Nucleating Agent for Polyolefin Resins>

The present invention also relates to a method for improving the fluidity of a nucleating agent for polyolefin resins, including granulating a raw material crystal nucleating agent (a) as a component (A), an organic acid monoglyceride as a component (B), and an organic compound having a melting point of 100° C. or higher as a component (C) by mixing under stirring while controlling the powder temperature at a temperature not lower than the melting point of the component (B) and not higher than the melting point of the component (C).

Preferably, a raw material crystal nucleating agent (b) as a component (D) is added to a crystal nucleating agent for polyolefin resins granulated by the method for improving the fluidity of a nucleating agent for polyolefin resins, and the crystal nucleating agent for polyolefin resins and the component (D) are granulated by heat-mixing while controlling the powder temperature at a temperature of not lower than the melting point of the component (B) and lower than the powder temperature in the mixing under stirring in the method for improving the fluidity of a nucleating agent for polyolefin resins.

The present invention also relates to a method for improving the fluidity of a nucleating agent for polyolefin resins, including mixing a raw material crystal nucleating agent (a) as a component (A) swelled with an organic solvent, 0.1 to 5 parts by weight of a sulfuric acid ester salt and/or a sulfonic acid salt as a component (E) dissolved in the organic solvent relative to 100 parts by weight of the component (A), and 0.3 to 5 parts by weight of a higher fatty acid as a component (F) in a powdery or granular form relative to 100 parts by weight of the component (A) to a ratio of the component (E) to the component (F), (E)/(F), of 1/3 to 4/1, followed by removing the organic solvent.

The description of the methods for improving the fluidity is the same as those in the sections "Crystal nucleating agent for polyolefin resins", "Granular crystal nucleating agent for polyolefin resins", "Granular or powdery crystal nucleating agent for polyolefin resins", and "Method for producing a crystal nucleating agent for polyolefin resins". The method for improving the fluidity is also not particularly limited to these methods as long as a desired performance is obtained.

<Polyolefin Resin Composition>

The present invention also relates to a polyolefin resin composition containing a polyolefin resin and the crystal nucleating agent for polyolefin resins of the present invention or a crystal nucleating agent for polyolefin resins produced by the production method of a crystal nucleating agent for polyolefin resins of the present invention. The polyolefin resin composition of the present invention can be easily obtained by dry-blending the crystal nucleating agent for polyolefin resins of the present invention, a polyolefin resin, and optionally other additive(s) for polyolefin resins at room temperature and then melt-mixing them under a predetermined condition.

The concentration of the crystal nucleating agent for polyolefin resins of the present invention in the polyolefin resin is not particularly limited as long as it can exert an effect as the crystal nucleating agent for polyolefin resins of the present invention. The concentration relative to 100 parts by weight of the polyolefin resin is preferably 0.001 to 10 parts by weight, more preferably 0.01 to 5 parts by weight.

[Polyolefin Resin]

The polyolefin resin is not particularly limited as long as the effect of the present invention is exerted, and conventionally known polyolefin resins are usable. Examples of the polyolefin resin include polyethylene resins, polypropylene resins, polybutene resins, polymethylpentene resins, and polybutadiene resins. More specific examples thereof include high-density polyethylene, medium-density polyethylene, linear polyethylene, ethylene copolymers having an ethylene content of 50% by weight or higher, preferably 70% by weight or higher, propylene homopolymers, propylene copolymers having a propylene content of 50% by weight or higher, preferably 70% by weight or higher, butene homopolymers, butene copolymers having a butene content of 50% by weight or higher, preferably 70% by weight or higher, methylpentene homopolymers, methylpentene copolymers having a methylpentene content of 50% by weight or higher, preferably 70% by weight or higher, and polybutadiene. The above copolymers each may be a random copolymer or a block copolymer. Moreover, in the case where these resins are each a stereoregular resin, it may be an isotactic resin or a syndiotactic resin. Specific examples of comonomers that can constitute the copolymers include: C2-C12 α-olefins such as ethylene, propylene, butene, pentene, hexene, heptene, octene, nonene, decene, undecene, and dodecene; bicyclo monomers such as 1,4-endomethylenecyclohexene; (meth)acrylic acid esters such as methyl (meth)acrylate and ethyl (meth)acrylate; and vinyl acetate.

Examples of the catalyst usable for production of the polymer include, in addition to commonly used ziegler-natta catalysts, catalyst systems combining a catalyst including a carrier containing magnesium halides (e.g., magnesium chloride) and a transition metal compound (e.g., titanium halides such as titanium trichloride and titanium tetrachloride) supported on the carrier with an alkyl aluminum compound (e.g., triethyl aluminum, diethyl aluminum chloride), and metallocene catalysts.

The melt flow rate (hereafter, abbreviated as "MFR", JIS K 7210-1999) of the polyolefin resin according to the present invention is selected as appropriate according to the molding method employed. The MFR is commonly about 0.01 to 200 g/10 min, preferably about 0.05 to 100 g/10 min.

[Other Additives]

As described above, the polyolefin resin composition of the present invention may contain other additive(s) for polyolefin resins according to the intended use or application thereof, within a range that the effect of the present invention is not impaired.

Examples of the additive for polyolefin resins include various additives listed in "The Tables of Positive Lists of Additives" edited by Japan Hygienic Olefin And Styrene Plastics Association (January, 2002). Specific examples of the various additives include fluorescent brighteners (e.g., 2,5-thiophene diyl(5-t-butyl-1,3-benzoxazole), 4,4'-bis(benzoxazol-2-yl)stilbene), antioxidants, stabilizers (e.g., metal compounds, epoxy compounds, nitrogen compounds, phosphorus compounds, sulfur compounds), ultraviolet absorbers (e.g., benzophenone compounds, benzotriazole compounds), surfactants, lubricants (e.g., aliphatic hydrocarbons such as paraffin and wax, C8-C22 higher fatty acids, C8-C22 higher fatty acid metal (Al, Ca) salts, C8-C22 higher aliphatic alcohols, polyglycol, esters of C4-C22 higher fatty acids and C4-C18 aliphatic monovalent alcohols, C8-C22 higher fatty acid amides, silicone oil, rosin derivatives), fillers (e.g., talc, hydrotalcite, mica, zeolite, perlite, diatom earth, calcium carbonate, glass fiber), foaming agents, foaming aids, polymer additives, plasticizers (e.g., dialkylphthalate, dialkylhexahydrophthalate), crosslinking agents, crosslinking accelerators, antistatic agents, flame retardants, dispersants, organic/inorganic pigments (e.g., indigo compounds, phthalocyanine compounds, anthraquinone compounds, ultramarine compounds, cobalt aluminate compounds), processing aids, and other nucleating agents.

In the case where any of these additives is used, it may be used in a usual amount as long as the effect of the present invention is not disturbed. For example, the amount relative to 100 parts by weight of the polyolefin resin is normally preferably about 0.0001 to 100 parts by weight, more preferably about 0.001 to 50 parts by weight.

Examples of the antioxidant that can be added include, in addition to the above phenol compounds and phosphorous acid ester compounds, phenolic antioxidants, phosphorous acid ester antioxidants, and sulfur antioxidants. Specific examples of the antioxidants include: phenolic antioxidants such as 2,6-di-t-butylphenol, tetrakis[methylene-3-(3,5-t-butyl-4-hydroxyphenol)propionate]methane, and 2-hydroxy-4-methoxybenzophenone; sulfur antioxidants such as alkyl disulfide, thiodipropionic acid ester, and benzothiazole; and phosphorous acid ester antioxidants such as tris (nonylphenyl) phosphite, diphenyl isodecyl phosphite, triphenyl phosphite, tris(2,4-di-t-butylphenyl)phosphite, and 3,9-bis(2,6-t-butyl-4-methylphenoxy)-2,4,8,10-tetraoxa-3,9-diphosphaspiro[5,5]undecane. Among these, particularly recommended are tetrakis[methylene-3-(3,5-di-t-butyl-4-hydroxyphenyl)propionate]methane that is a phenolic antioxidant, and tris(2,4-di-t-butylphenyl)phosphite and 3,9-bis(2,6-t-butyl-4-methylphenoxy)-2,4,8,10-tetraoxa-3,9-diphosphaspiro[5,5]undecane that are phosphorous acid ester antioxidants.

<Polyolefin Resin Molded Article>

The polyolefin resin molded article of the present invention is obtainable by molding the polyolefin resin composition of the present invention by a commonly used molding method. The molding method is not particularly limited as long as the effect of the present invention is exerted. Any of conventionally known molding methods such as injection molding, extrusion molding, blow molding, pressure molding, rotational molding, and film molding may be employed.

The polyolefin resin molded article obtained as above is excellent in optical characteristics (e.g., transparency) and mechanical properties (e.g., impact resistance) and is very useful for various applications including automobile parts, electric parts, machine components, and commodities in the form of a molded article, a sheet, or a film.

EXAMPLES

The present invention is more specifically described in the following with reference to, but not limited to, the examples. The abbreviations of the compounds used in examples and application examples, and the measurement process of each property are mentioned below.

[Characteristics of Crystal Nucleating Agent for Polyolefin Resins]

(1) Measurement of Average Particle Size of Component (A) and Component (D) (Laser Diffraction Particle Size Distribution Analysis)

The average particle size was measured with a laser diffraction particle size distribution analyzer ("Mastersizer 3000" available from Malvern Instruments) by the following method. First, a sample was dispersed in an aqueous solution containing a nonionic surfactant as a dispersant by sufficient mixing under stirring in a wet measurement cell, the resulting mixture was further stirred and circulated in the analyzer and sufficiently uniformly dispersed in the analyzer under irradiation with ultrasonic wave, and the particle size distribution of the sample was measured under irradiation with ultrasonic wave. The volume-based cumulative 50% particle size (d50) as the average particle size was determined from the obtained particle size distribution.

(2-1) Measurement of Particle Size of Granular Crystal Nucleating Agent for Polyolefin Resins (Sieve Analysis)

Sieve analysis was carried out under the conditions in conformity with section 6.1 of JIS K0069 (1992). The weight of the residue on a JIS test sieve having an aperture of 600 μm was accurately measured with a chemical balance. The proportion of the obtained weight of the residue on the sieve having an aperture of 600 μm to the total weight of the sample used in the analysis was determined.

(2-2) Measurement of Average Particle Size of Granular or Powdery Crystal Nucleating Agent for Polyolefin Resins (Laser Diffraction Particle Size Distribution Analysis)

The average particle size was measured with a laser diffraction particle size distribution analyzer ("Mastersizer 3000" available from Malvern Instruments) by the following method. First, a sample was dispersed in an aqueous solution containing a nonionic surfactant as a dispersant by sufficient mixing under stirring in a wet measurement cell, the resulting mixture was further stirred and circulated in the analyzer and sufficiently uniformly dispersed in the analyzer under irradiation with ultrasonic wave, and the particle size distribution of the sample was measured under irradiation with ultrasonic wave. The volume-based cumulative 50% particle size (d50) as the average particle size was determined from the obtained particle size distribution.

(3) Measurement of Compression Ratio

A funnel was perpendicularly held at a position of 2 cm above the opening section of a 100-cm$^3$ measuring cylinder with its axis aligned with the axis of the measuring cylinder. A crystal nucleating agent in an amount of 100 cm$^3$ was slowly (without pressurization) put into the 100-cm$^3$ measuring cylinder through the funnel. The weight of the crystal nucleating agent in the measuring cylinder was measured to 0.1-g units using a scale. The aerated bulk density was obtained by the following equation (1) using the obtained weight. Subsequently, the measuring cylinder was vertically dropped onto a rubber sheet from a height of 5 cm (tapping) for 50 times. The volume of the crystal nucleating agent in the measuring cylinder was read to 0.1-cm$^3$ units, and the packed bulk density was obtained using the following equation (2). The compression ratio was determined from the obtained aerated bulk density and packed bulk density using the following equation (3). Typically, a compression ratio closer to 1 is considered to indicate higher fluidity.

Aerated bulk density (g/cm$^3$)=Weight of crystal nucleating agent in measuring cylinder (g)/100 cm$^3$   Equation (1):

Packed bulk density (g/cm$^3$)=Weight of crystal nucleating agent in measuring cylinder (g)/Volume of crystal nucleating agent after tapping (cm$^3$)   Equation (2):

Compression ratio=Packed bulk density/Aerated bulk density   Equation (3):

[Evaluation of Fluidity]
(4) Measurement of Angle of Repose

Under the conditions of a temperature of 25° C. and a humidity of 60%, the crystal nucleating agent for polyolefin resins in an amount of 30 g was fed into a funnel having an opening section with a diameter of 9 cm and a hole with a diameter of 1 cm from the height of 1 cm above the upper edge of the funnel, and dropped without vibration onto a circular stage with a diameter of 9 cm placed 10 cm below the lower outlet of the funnel. The height of the conical deposition of the dropped crystal nucleating agent was measured, and the angle formed between the horizontal plane and the generatrix was obtained by calculation as the angle of repose (unit: degree). A smaller angle of repose indicates better powder fluidity.

(5) Powder Fluidity Test (Funnel Test)

The crystal nucleating agent for polyolefin resins was fed into a funnel having an opening with a diameter of 15 cm and a hole with a diameter of 1.5 cm from the height of 5 cm above the upper edge of the funnel, and dropped through a lower outlet without vibration. The fluidity of the crystal nucleating agent for polyolefin resins was evaluated based on the discharge state of the crystal nucleating agent from the funnel on a four-point scale in accordance with the following criteria.

(Evaluation Criteria)

Excellent: The entire crystal nucleating agent for polyolefin resins was immediately discharged from the funnel and almost no deposition was found on the inner wall of the funnel.

Good: The crystal nucleating agent for polyolefin resins was slightly left in the funnel without being discharged but the residual crystal nucleating agent in the funnel was entirely discharged with application of a small impact.

Fair: The crystal nucleating agent for polyolefin resins was left in the funnel without being discharged and complete discharge of the residual crystal nucleating agent in the funnel was difficult only with application of a small impact.

Poor: A large amount of the crystal nucleating agent for polyolefin resins was left in the funnel without being discharged and discharge of the residual crystal nucleating agent in the funnel was difficult even with application of an impact.

[Evaluation of Caking Tendency]
(6) Caking Test

An amount of 10 g of the granular crystal nucleating agent for polyolefin resins was put in a beaker and left to stand in an oven set at 50° C. for 24 hours. The state of the granular crystal nucleating agent for polyolefin resins in the beaker taken out of the oven was visually checked, and evaluated according to the following four-point criteria.

Excellent: No lumps were formed.
Good: Lumps were hardly formed, or if formed, very fragile and soft.
Fair: Some lumps were formed but easily breakable and hardly problematic in practical use.
Poor: The sample as a whole formed a lump and needed crushing for use.

[Characteristics of Molded Article]
(7) Measurement of Haze Value

The haze value was measured using a haze meter available from Toyo Seiki Seisakusho, Ltd. by a method in conformity with JIS K 7136 (2000). The evaluation sample used was a polypropylene resin molded article that was a 1-mm-thick injection molded article. A smaller haze value indicates better transparency.

(8) Evaluation of White Spots

The evaluation sample used was a polyolefin resin molded article (50 mm×50 mm×1 mm) obtained by injection molding. The number of white spots in the molded article was visually counted. The numbers of white spots on five sheets of the samples was averaged, and the obtained value was used as the number of white spots of the sample. The obtained results were classified and rated on the following three-point scale.

Excellent: The number of white spots is less than 3. No problems at all in terms of the performance of the molded article.

Good: The number of white spots is within a range of 3 to 15. No problems in terms of the performance as the nucleating agent but there may possibly be an influence of an undispersed matter in terms of other physical properties.

Poor: The number of white spots is more than 15. The effect in terms of the performance as the nucleating agent is obviously insufficient and an undispersed matter may highly possibly cause a problem in terms of various physical properties.

ABBREVIATIONS OF COMPOUNDS IN EXAMPLES

EDBS: 1,3:2,4-bis-O-(p-ethylbenzylidene)-D-sorbitol
DMDBS: 1,3:2,4-bis-O-(3',4'-dimethylbenzylidene)-D-sorbitol
PDBN: 1,3:2,4-bis-O-(p-n-propylbenzylidene)-1-n-propyl-sorbitol
GMS: glycerol monostearate
Irg1010: tetrakis[methylene-3-(3,5-di-t-butyl-4-hydroxyphenyl)propionate]methane (available from BASF Japan Ltd., product name "IRGANOX1010")
CaSt: calcium stearate
NaLS: sodium lauryl sulfate
NaDBS: sodium dodecyl benzene sulfonate
St: stearic acid
12HSt: 12-hydroxystearic acid

Example 1

A 20-L Super Mixer (available from Kawata Mfg. Co., Ltd.) equipped with a thermometer was charged with 1.5 kg of DMDBS (available from New Japan Chemical Co., Ltd., GEL ALL DXR, average particle size: 6.2 µm), 0.5 kg of GMS (available from Riken Vitamin Co., Ltd., melting point: 65° C.), and 0.3 kg of Irg1010 (melting point: 120° C.) at room temperature. The components were stirred at a stirring rate of 300 rpm while steam-heating the jacket. After the powder temperature was raised to 65° C., the steam was turned off and stirring was performed at a stirring rate of 1500 rpm for 5 minutes. Thus, a granular crystal nucleating agent for polyolefin resins was obtained. The final powder temperature was 96° C. The results of sieve analysis of the obtained granular crystal nucleating agent for polyolefin resins showed that the proportion of the residue on the sieve having an aperture of 600 µm was 30% by weight relative to the total weight of the sample.

Subsequently, the compression ratio and angle of repose of the obtained granular crystal nucleating agent for polyolefin resins were measured. Table 1 shows the results. The obtained granular crystal nucleating agent for polyolefin resins was also subjected to evaluation of the caking tendency and evaluation of powder fluidity by the powder fluidity test (funnel test). Table 1 shows the results.

Example 2

A granular crystal nucleating agent for polyolefin resins was obtained as in Example 1 except that the amount of DMDBS was changed to 1.4 kg, the amount of GMS was changed to 0.3 kg, and the amount of Irg1010 was changed to 0.3 kg. The final powder temperature was 94° C. The results of sieve analysis of the obtained granular crystal nucleating agent for polyolefin resins showed that the proportion of the residue on the sieve having an aperture of 600 µm was 58% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

Example 3

A granular crystal nucleating agent for polyolefin resins was obtained as in Example 1 except that the amount of DMDBS was changed to 1.4 kg, the amount of GMS was changed to 0.4 kg, and the amount of Irg1010 was changed to 0.2 kg. The final powder temperature was 99° C. The results of sieve analysis of the obtained granular crystal nucleating agent for polyolefin resins showed that the proportion of the residue on the sieve having an aperture of 600 µm was 99% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

Example 4

A 20-L Super Mixer equipped with a thermometer was charged with 1.4 kg of DMDBS, 0.3 kg of GMS, and 0.3 kg of Irg1010 at room temperature. The components were stirred at a stirring rate of 300 rpm while steam-heating the jacket. After the powder temperature was raised to 65° C., the steam was turned off and stirring was performed at a stirring rate of 1500 rpm for 5 minutes. Thus, a granular crystal nucleating agent for polyolefin resins to serve as a core was obtained. The powder temperature at this time was 96° C. Subsequently, stirring was stopped, and an additional 0.1 kg of DMDBS was put in the Super Mixer. Stirring was performed again at a stirring rate of 1500 rpm for 3 minutes. The final powder temperature was 90° C. The results of sieve analysis of the obtained granular crystal nucleating agent for polyolefin resins showed that the proportion of the residue on the sieve having an aperture of 600 µm was 98% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

Example 5

A granular crystal nucleating agent for polyolefin resins was obtained as in Example 4 except that the amount of additional DMDBS was changed to 0.2 kg. The final powder temperature was 87° C. The results of sieve analysis of the obtained granular crystal nucleating agent for polyolefin resins showed that the proportion of the residue on the sieve having an aperture of 600 µm was 84% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

Example 6

A granular crystal nucleating agent for polyolefin resins was obtained as in Example 2 except that DMDBS was changed to PDBN (average particle size: 5.9 μm). The final powder temperature was 95° C. The results of sieve analysis of the obtained granular crystal nucleating agent for polyolefin resins showed that the proportion of the residue on the sieve having an aperture of 600 μm was 50% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

Example 7

A granular crystal nucleating agent for polyolefin resins was obtained as in Example 2 except that Irg1010 was changed to CaSt (available from Nitto Kasei Co., Ltd., melting point: 148° C.). The final powder temperature was 100° C. The results of sieve analysis of the obtained granular crystal nucleating agent for polyolefin resins showed that the proportion of the residue on the sieve having an aperture of 600 μm was 99% by weight relative to the total weight of the sample.

Subsequently, the compression ratio and angle of repose of the obtained granular crystal nucleating agent for polyolefin resins were measured as in Example 1. Further, evaluations of the caking tendency and the powder fluidity were performed. Table 1 shows the results.

stearate (CaSt), 0.01 parts by weight of tetrakis [methylene-3-(3,5-di-t-butyl-4-hydroxyphenyl)propionate]methane (Irg1010), and 0.05 parts by weight of tetrakis (2,4-di-t-butylphenyl)phosphite (available from BASF Japan Ltd., product name: "IRGAFOS168") as other additives were dry-blended. The dry-blended mixture was melted and mixed using a single screw extruder (VS-20 available from Tanabe Plastics Machinery Co., Ltd.) at a barrel temperature of 250° C., and the extruded strands were cooled and cut using a pelletizer. Thus, a polyolefin resin composition was prepared.

Next, the obtained polyolefin resin composition was molded using an injection molding apparatus (NS40-5A available from Nissei Plastic Industrial Co., Ltd.) under the conditions of an injection molding temperature (heating temperature) of 240° C. and a die temperature (cooling temperature) of 40° C. to provide a 1-mm-thick polyolefin resin molded article and a 2-mm-thick polyolefin resin molded article.

The obtained molded articles were used as evaluation samples in measurement of the haze value. Table 2 shows the results. The visual evaluation of white spots in the molded articles by the above method was performed. Table 2 shows the results.

Example 9

A polyolefin resin composition and a polyolefin resin molded articles were obtained as in Example 8 except that 0.29 parts by weight of the granular crystal nucleating agent for polyolefin resins obtained in Example 2 was used as a crystal nucleating agent for polyolefin resins. The haze value of the obtained molded articles was measured. Table 2 shows the results. Subsequently, the visual evaluation of white spots in the molded articles was performed. Table 2 shows the results.

TABLE 1

| | | Example | | | | | | |
|---|---|---|---|---|---|---|---|---|
| | | 1 | 2 | 3 | 4 | 5 | 6 | 7 |
| Formulation in step (i) (% by weight) | | | | | | | | |
| Component (A) | Type | DMDBS | DMDBS | DMDBS | DMDBS | DMDBS | PDBN | DMDBS |
| | Amount | 65 | 70 | 70 | 70 | 70 | 70 | 70 |
| Component (B) | Type | GMS | GMS | GMS | GMS | GMS | GMS | GMS |
| | Amount | 22 | 15 | 20 | 15 | 15 | 15 | 15 |
| Component (C) | Type | Irg1010 | Irg1010 | Irg1010 | Irg1010 | Irg1010 | Irg1010 | CaSt |
| | Amount | 13 | 15 | 10 | 15 | 15 | 15 | 15 |
| Formulation in step (ii) (parts by weight) | | | | | | | | |
| Component (D) | Type | — | — | — | DMDBS | DMDBS | — | — |
| | Amount | — | — | — | 5 | 10 | — | — |
| (1) Characteristics of crystal nucleating agent | | | | | | | | |
| Compression ratio | | 1.19 | 1.06 | 1.02 | 1.01 | 1.02 | 1.09 | 1.04 |
| Angle of repose | Degrees | 35 | 28 | 26 | 27 | 28 | 30 | 28 |
| Caking test | | Good | Good | Good | Excellent | Excellent | Good | Excellent |
| Powder fluidity test | | Excellent | Excellent | Excellent | Excellent | Excellent | Good | Good |

Example 8

An amount of 100 parts by weight of a polypropylene random copolymer (MFR=7 g/10 min (load: 2160 g, temperature: 230° C.), R-720 available from Prime Polymer Co., Ltd.) as a polyolefin rein, 0.31 parts by weight of the granular crystal nucleating agent for polyolefin resins obtained in Example 1 as a crystal nucleating agent for polyolefin resins, and 0.05 parts by weight of calcium Example 10

A polyolefin resin composition and a polyolefin resin molded articles were obtained as in Example 8 except that 0.29 parts by weight of the granular crystal nucleating agent for polyolefin resins obtained in Example 3 was used as a crystal nucleating agent for polyolefin resins and the amount of Irg1010 was changed to 0.02 parts by weight. The haze value of the obtained molded articles was measured. Table 2 shows the results. Subsequently, the visual evaluation of white spots in the molded articles was performed. Table 2 shows the results.

Example 11

A polyolefin resin composition and a polyolefin resin molded articles were obtained as in Example 8 except that 0.28 parts by weight of the granular crystal nucleating agent for polyolefin resins obtained in Example 4 was used as a crystal nucleating agent for polyolefin resins. The haze value of the obtained molded articles was measured. Table 2 shows the results. Subsequently, the visual evaluation of white spots in the molded articles was performed. Table 2 shows the results.

Example 12

A polyolefin resin composition and a polyolefin resin molded articles were obtained as in Example 8 except that 0.28 parts by weight of the granular crystal nucleating agent for polyolefin resins obtained in Example 5 was used as a crystal nucleating agent for polyolefin resins. The haze value of the obtained molded articles was measured. Table 2 shows the results. Subsequently, the visual evaluation of white spots in the molded articles was performed. Table 2 shows the results.

Example 13

A polyolefin resin composition and a polyolefin resin molded articles were obtained as in Example 8 except that 0.29 parts by weight of the granular crystal nucleating agent for polyolefin resins obtained in Example 6 was used as a crystal nucleating agent for polyolefin resins. The haze value of the obtained molded articles was measured. Table 2 shows the results. Subsequently, the visual evaluation of white spots in the molded articles was performed. Table 2 shows the results.

Example 14

A polyolefin resin composition and a polyolefin resin molded articles were obtained as in Example 8 except that 0.29 parts by weight of the granular crystal nucleating agent for polyolefin resins obtained in Example 7 was used as a crystal nucleating agent for polyolefin resins, the amount of Irg1010 was changed to 0.05 parts by weight, and the amount of calcium stearate was changed to 0.01 parts by weight. The haze value of the obtained molded articles was measured. Table 2 shows the results. Subsequently, the visual evaluation of white spots in the molded articles was performed. Table 2 shows the results.

TABLE 2

| | Example | | | | | | |
|---|---|---|---|---|---|---|---|
| | 8 | 9 | 10 | 11 | 12 | 13 | 14 |
| (2) Evaluation of molded articles | | | | | | | |
| Haze value | 10 | 9 | 10 | 8 | 7 | 7 | 11 |
| Evaluation of white spots | Excellent | Good | Good | Good | Good | Excellent | Good |

The results in Table 1 and Table 2 show that the granular crystal nucleating agent for polyolefin resins according to the present invention has excellent fluidity and greatly contributes to improvement of the productivity without causing problems such as caking, and that polyolefin resin molded articles containing the granular crystal nucleating agents for polyolefin resins have very excellent transparency without problems such as white spots and thus are very useful in various applications.

Example 15

A universal stirring mixer (5dmv-01-rr available from Dalton Corporation, capacity of 4.7 L) equipped with a thermometer and a condenser was charged with 300 g of DMDBS and 400 g of methanol, followed by stirring at 60° C. for one hour to sufficiently swell the DMDBS with the methanol. Next, 3 g of NaLS uniformly dissolved in methanol and 7.5 g of powdery St were added, followed by further mixing under stirring at 60° C. for two hours. Subsequently, 200 g of water was added, and then the pressure in the system was gradually reduced to remove the solvent. Finally, the temperature was raised to 100° C. to completely remove the solvent, thus a dried product was obtained. The dried product was pulverized with a pulverizer to provide a powdery crystal nucleating agent for polyolefin resins. Laser diffraction particle size distribution measurement showed that the pulverized (powdery) crystal nucleating agent for polyolefin resins had an average particle size of 4 μm.

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 16

A crystal nucleating agent for polyolefin resins was obtained as in Example 15 except that the amount of NaLS was changed to 7.5 g and the amount of St was changed to 6 g. The obtained crystal nucleating agent for polyolefin resins had an average particle size of 5 μm.

The compression ratio and angle of repose of the obtained crystal nucleating agent for polyolefin resins were measured. Table 3 shows the results. Subsequently, the obtained crystal nucleating agent was subjected to evaluation of the powder fluidity by the powder fluidity test (funnel test). Table 3 shows the results.

Example 17

A crystal nucleating agent for polyolefin resins was obtained as in Example 15 except that the amount of NaLS was changed to 6 g and the amount of St was changed to 1.5 g. The obtained crystal nucleating agent for polyolefin resins had an average particle size of 4 μm.

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 18

A crystal nucleating agent for polyolefin resins was obtained as in Example 15 except that the amount of NaLS was changed to 6.75 g and the amount of St was changed to 3.75 g. The obtained crystal nucleating agent for polyolefin resins had an average particle size of 4 μm.

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 19

A crystal nucleating agent for polyolefin resins was obtained as in Example 15 except that St was changed to 12HSt. The obtained crystal nucleating agent for polyolefin resins had an average particle size of 4 μm.

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 20

A crystal nucleating agent for polyolefin resins was obtained as in Example 15 except that NaLS was changed to NaDBS. The obtained crystal nucleating agent for polyolefin resins had an average particle size of 4 μm.

Example 22

A crystal nucleating agent for polyolefin resins was obtained as in Example 15 except that DMDBS was changed to PDBN. The obtained crystal nucleating agent for polyolefin resins had an average particle size of 6 μm.

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 23

The powdery crystal nucleating agent obtained in Example 15 was compressed by a roller compression method. The compressed product was pulverized to provide a granular crystal nucleating agent for polyolefin resins. The obtained granular crystal nucleating agent for polyolefin resins had an average particle size of 30 μm.

The compression ratio and angle of repose of the obtained granular crystal nucleating agent for polyolefin resins were measured. Table 3 shows the results. Subsequently, the obtained granular crystal nucleating agent for polyolefin resins was subjected to evaluation of the powder fluidity by the powder fluidity test (funnel test). Table 3 shows the results.

TABLE 3

| | | Example | | | | | | | | |
|---|---|---|---|---|---|---|---|---|---|---|
| | | 15 | 16 | 17 | 18 | 19 | 20 | 21 | 22 | 23 |
| Formulation (parts by weight) | | | | | | | | | | |
| Component (A) | Type | DMDBS | DMDBS | DMDBS | DMDBS | DMDBS | DMDBS | EDBS | PDBN | DMDBS |
| Component (E) | Type | NaLS | NaLS | NaLS | NaLS | NaLS | NaDBS | NaLS | NaLS | NaLS |
| | Amount | 1.0 | 2.5 | 2.0 | 2.25 | 1.0 | 1.0 | 1.0 | 1.0 | 1.0 |
| Component (F) | Type | St | St | St | St | 12HSt | St | St | St | St |
| | Amount | 2.5 | 2.0 | 0.5 | 1.25 | 2.5 | 2.5 | 2.5 | 2.5 | 2.5 |
| (1) Characteristics of crystal nucleating agent | | | | | | | | | | |
| Compression ratio | | 1.28 | 1.23 | 1.29 | 1.25 | 1.28 | 1.28 | 1.32 | 1.36 | 1.19 |
| Angle of repose | Degrees | 45 | 44 | 46 | 45 | 45 | 46 | 46 | 46 | 43 |
| Powder fluidity test | | Excellent | Excellent | Good | Excellent | Excellent | Good | Good | Excellent | Excellent |

The compression ratio and angle of repose of the obtained crystal nucleating agent for polyolefin resins were measured. Table 3 shows the results. Subsequently, the obtained crystal nucleating agent for polyolefin resins was subjected to evaluation of the powder fluidity by the powder fluidity test (funnel test). Table 3 shows the results.

Example 21

A crystal nucleating agent for polyolefin resins was obtained as in Example 15 except that DMDBS was changed to EDBS. The obtained crystal nucleating agent for polyolefin resins had an average particle size of 7 μm.

The compression ratio and angle of repose of the obtained crystal nucleating agent for polyolefin resins were measured. Table 3 shows the results. Subsequently, the obtained crystal nucleating agent was subjected to evaluation of the powder fluidity by the powder fluidity test (funnel test). Table 3 shows the results.

Comparative Example 1

A crystal nucleating agent for polyolefin resins outside the scope of the present invention was obtained as in Example 15 except that the amount of NaLS was changed to 30 g. The obtained crystal nucleating agent for polyolefin resins had an average particle size of 4 μm.

The compression ratio and angle of repose of the obtained crystal nucleating agent for polyolefin resins were measured. Table 4 shows the results. Subsequently, the obtained crystal nucleating agent for polyolefin resins was subjected to evaluation of the powder fluidity by the powder fluidity test (funnel test). Table 4 shows the results.

Comparative Example 2

A crystal nucleating agent for polyolefin resins outside the scope of the present invention was obtained as in Example 15 except that the amount of St was changed to 30 g. The obtained crystal nucleating agent for polyolefin resins had an average particle size of 5 μm.

The compression ratio and angle of repose of the obtained crystal nucleating agent for polyolefin resins were measured. Table 4 shows the results. Subsequently, the obtained crystal nucleating agent was subjected to evaluation of the powder fluidity by the powder fluidity test (funnel test). Table 4 shows the results.

Comparative Example 3

A crystal nucleating agent outside the scope of the present invention was obtained as in Example 15 except that the component (F) was not added. The obtained crystal nucleating agent had an average particle size of 5 μm.

The compression ratio and angle of repose of the obtained crystal nucleating agent were measured. Table 4 shows the results. Subsequently, the obtained crystal nucleating agent was subjected to evaluation of the powder fluidity by the powder fluidity test (funnel test). Table 4 shows the results.

Comparative Example 4

A crystal nucleating agent for polyolefin resins outside the scope of the present invention was obtained as in Example 15 except that the component (E) was not added. The obtained crystal nucleating agent for polyolefin resins had an average particle size of 7 μm.

The compression ratio and angle of repose of the obtained crystal nucleating agent for polyolefin resins were measured. Table 4 shows the results. Subsequently, the obtained crystal nucleating agent for polyolefin resins was subjected to evaluation of the powder fluidity by the powder fluidity test (funnel test). Table 4 shows the results.

Comparative Example 5

A universal stirring mixer (5dmv-01-rr available from Dalton Corporation, capacity of 4.7 L) equipped with a thermometer and a condenser was charged with 300 g of DMDBS and 400 g of water, followed by stirring at 60° C. for one hour. Even one hour later, the DMDBS was not verized crystal nucleating agent for polyolefin resins had an average particle size of 5 μm.

The compression ratio and angle of repose of the obtained crystal nucleating agent for polyolefin resins were measured. Table 4 shows the results. Subsequently, the obtained crystal nucleating agent for polyolefin resins was subjected to evaluation of the powder fluidity by the powder fluidity test (funnel test). Table 4 shows the results.

Comparative Example 6

A crystal nucleating agent for polyolefin resins outside the scope of the present invention was obtained as in Example 15 except that the component (E) was added in the powder state without being dissolved in a solvent. The obtained crystal nucleating agent for polyolefin resins had an average particle size of 4 μm.

The compression ratio and the angle of repose of the obtained crystal nucleating agent were measured. Table 4 shows the results. Subsequently, the obtained crystal nucleating agent for polyolefin resins was subjected to evaluation of the powder fluidity by the powder fluidity test (funnel test). Table 4 shows the results.

Comparative Example 7

A universal stirring mixer (5dmv-01-rr available from Dalton Corporation, capacity of 4.7 L) equipped with a thermometer and a condenser was charged with 300 g of DMDBS, 3 g of powdery NaLS, and 7.5 g of powdery St, followed by mixing under stirring at 60° C. for two hours. Thus, a crystal nucleating agent for polyolefin resins outside the scope of the present invention was obtained.

The compression ratio and angle of repose of the obtained crystal nucleating agent for polyolefin resins were measured. Table 4 shows the results. Subsequently, the obtained crystal nucleating agent for polyolefin resins was subjected to evaluation of the powder fluidity by the powder fluidity test (funnel test). Table 4 shows the results.

TABLE 4

| | | Comparative Example | | | | | | |
|---|---|---|---|---|---|---|---|---|
| | | 1 | 2 | 3 | 4 | 5 | 6 | 7 |
| Formulation (parts by weight) | | | | | | | | |
| Component (A) | Type | DMDBS | DMDBS | DMDBS | DMDBS | DMDBS | DMDBS | DMDBS |
| Component (E) | Type | NaLS | NaLS | NaLS | — | NaLS | NaLS | NaLS |
| | Amount | 10 | 1.0 | 1.0 | — | 1.0 | 1.0 | 1.0 |
| Component (F) | Type | St | St | — | St | St | St | St |
| | Amount | 2.5 | 10 | — | 2.5 | 2.5 | 2.5 | 2.5 |
| (1) Characteristics of crystal nucleating agent | | | | | | | | |
| Compression ratio | | 1.24 | 1.18 | 1.33 | 1.27 | 1.30 | 1.30 | 1.42 |
| Angle of repose | Degrees | 45 | 44 | 50 | 49 | 50 | 49 | 51 |
| Powder fluidity test | | Good | Excellent | Fair | Fair | Poor | Fair | Poor | swelled. Next, 3 g of NaLS uniformly dissolved in water and 7.5 g of powdery St were added, followed by further mixing under stirring at 60° C. for two hours. Subsequently, the pressure in the system was gradually reduced to remove the solvent. Finally, the temperature was raised to 100° C. to completely remove the solvent, thus a dried product was obtained. The dried product was pulverized with a pulverizer to provide a crystal nucleating agent for polyolefin resins outside the scope of the present invention. Laser diffraction particle size distribution measurement showed that the pul- Example 24

An amount of 100 parts by weight of a polypropylene random copolymer (MFR=7 g/10 min (load: 2160 g, temperature: 230° C.), R-720 available from Prime Polymer Co., Ltd.) as a polyolefin resin, 0.2 parts by weight of the crystal nucleating agent for polyolefin resins obtained in Example 15 as a crystal nucleating agent for polyolefin reins, and 0.05 parts by weight of calcium stearate (available from Nitto Kasei Co., Ltd., product name: "Ca-St"), 0.05 parts by weight of tetrakis[methylene-3-(3,5-di-t-butyl-4-hydroxyphenyl)propionate]methane (available from BASF Japan Ltd., product name: "IRGANOX1010"), and 0.05 parts by weight of tetrakis(2,4-di-t-butylphenyl)phosphite (available from BASF Japan Ltd., product name: "IRGAFOS168") as other additives were dry-blended. The dry-blended mixture was melted and mixed using a single screw extruder (VS-20 available from Tanabe Plastics Machinery Co., Ltd.) at a barrel temperature of 250° C., and the extruded strands were cooled and cut using a pelletizer. Thus, a polyolefin resin composition was prepared.

Next, the obtained polyolefin resin composition was molded using an injection molding apparatus (NS40-5A available from Nissei Plastic Industrial Co., Ltd.) under the conditions of an injection molding temperature (heating temperature) of 240° C. and a die temperature (cooling temperature) of 40° C. to provide a 1-mm-thick polyolefin resin molded article.

The haze value of the obtained molded article as an evaluation samples was measured. Table 5 shows the results. Subsequently, the visual evaluation of white spots in the molded article by the above method was performed. Table 5 shows the results.

Example 25

A polyolefin resin composition and a polyolefin resin molded article were obtained as in Example 24 except that the crystal nucleating agent for polyolefin resins obtained in Example 16 was used as a crystal nucleating agent for polyolefin resins. The haze value of the obtained molded article was measured. Table 5 shows the results. Subsequently, the visual evaluation of white spots in the molded article was performed. Table 5 shows the results.

Example 26

A polyolefin resin composition and a polyolefin resin molded article were obtained as in Example 24 except that the crystal nucleating agent for polyolefin resins obtained in Example 17 was used as a crystal nucleating agent for polyolefin resins. The haze value of the obtained molded article was measured. Table 5 shows the results. Subsequently, the visual evaluation of white spots in the molded article was performed. Table 5 shows the results.

Example 27

A polyolefin resin composition and a polyolefin resin molded article were obtained as in Example 24 except that the crystal nucleating agent for polyolefin resins obtained in Example 18 was used as a crystal nucleating agent for polyolefin resins. The haze value of the obtained molded article was measured. Table 5 shows the results. Subsequently, the visual evaluation of white spots in the molded article was performed. Table 5 shows the results.

Example 28

A polyolefin resin composition and a polyolefin resin molded article were obtained as in Example 24 except that the crystal nucleating agent for polyolefin resins obtained in Example 19 was used as a crystal nucleating agent for polyolefin resins. The haze value of the obtained molded article was measured. Table 5 shows the results. Subsequently, the visual evaluation of white spots in the molded article was performed. Table 5 shows the results.

TABLE 5

| | Example | | | | |
|---|---|---|---|---|---|
| | 24 | 25 | 26 | 27 | 28 |
| (2) Evaluation of molded article | | | | | |
| Haze value | 7 | 9 | 7 | 8 | 9 |
| Evaluation of white spots | Excellent | Excellent | Excellent | Excellent | Excellent |

Example 29

A polyolefin resin composition and a polyolefin resin molded article were obtained as in Example 24 except that the crystal nucleating agent for polyolefin resins obtained in Example 20 was used as a crystal nucleating agent for polyolefin resins. The haze value of the obtained molded article was measured. Table 6 shows the results. Subsequently, the visual evaluation of white spots in the molded article was performed. Table 6 shows the results.

Example 30

A polyolefin resin composition and a polyolefin resin molded article were obtained as in Example 24 except that the crystal nucleating agent for polyolefin resins obtained in Example 21 was used as a crystal nucleating agent for polyolefin resins. The haze value of the obtained molded article was measured. Table 6 shows the results. Subsequently, the visual evaluation of white spots in the molded article was performed. Table 6 shows the results.

Example 31

A polyolefin resin composition and a polyolefin resin molded article were obtained as in Example 24 except that the crystal nucleating agent for polyolefin resins obtained in Example 22 was used as a crystal nucleating agent for polyolefin resins. The haze value of the obtained molded article was measured. Table 6 shows the results. Subsequently, the visual evaluation of white spots in the molded article was performed. Table 6 shows the results.

Example 32

A polyolefin resin composition and a polyolefin resin molded article were obtained as in Example 24 except that the crystal nucleating agent for polyolefin resins obtained in Example 23 was used as a crystal nucleating agent for polyolefin resins. The haze value of the obtained molded article was measured. Table 6 shows the results. Subsequently, the visual evaluation of white spots in the molded article was performed. Table 6 shows the results.

TABLE 6

| | Example | | | |
|---|---|---|---|---|
| | 29 | 30 | 31 | 32 |
| (2) Evaluation of molded article | | | | |
| Haze value | 8 | 10 | 12 | 9 |
| Evaluation of white spots | Excellent | Excellent | Excellent | Good |

Comparative Example 8

A polyolefin resin composition and a polyolefin resin molded article were obtained as in Example 24 except that the crystal nucleating agent for polyolefin resins outside the scope of the present invention obtained in Comparative Example 1 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 9

A polyolefin resin composition and a polyolefin resin molded article were obtained as in Example 24 except that the crystal nucleating agent for polyolefin resins outside the scope of the present invention obtained in Comparative Example 2 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 10

A polyolefin resin composition and a polyolefin resin molded article were obtained as in Example 24 except that the crystal nucleating agent for polyolefin resins outside the scope of the present invention obtained in Comparative Example 3 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 11

A polyolefin resin composition and a polyolefin resin molded article were obtained as in Example 24 except that the crystal nucleating agent for polyolefin resins outside the scope of the present invention obtained in Comparative Example 4 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 12

A polyolefin resin composition and a polyolefin resin molded article were obtained as in Example 24 except that the crystal nucleating agent for polyolefin resins outside the scope of the present invention obtained in Comparative Example 5 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 131

A polyolefin resin composition and a polyolefin resin molded article were obtained as in Example 24 except that the crystal nucleating agent for polyolefin resins outside the scope of the present invention obtained in Comparative Example 6 was used as a crystal nucleating agent for polyolefin resins. The haze value of the obtained molded article was measured. Table 7 shows the results. Subsequently, the visual evaluation of white spots in the molded article was performed. Table 7 shows the results.

Comparative Example 14

A polyolefin resin composition and a polyolefin resin molded article were obtained as in Example 24 except that the crystal nucleating agent for polyolefin resins outside the scope of the present invention obtained in Comparative Example 7 was used as a crystal nucleating agent for polyolefin resins. The haze value of the obtained molded article was measured. Table 7 shows the results. Subsequently, the visual evaluation of white spots in the molded article was performed. Table 7 shows the results.

TABLE 7

| | Comparative Example | | | | | | |
|---|---|---|---|---|---|---|---|
| | 8 | 9 | 10 | 11 | 12 | 13 | 14 |
| | (2) Evaluation of molded article | | | | | | |
| Haze value | 15 | 22 | 8 | 9 | 15 | 11 | 18 |
| Evaluation of white spots | Good | Fair | Good | Good | Poor | Good | Poor |

Comparison of the results of Examples 15 to 23 in Table 3 and those of Comparative Examples 3 to 7 in Table 4 shows that none of the crystal nucleating agents for polyolefin resins obtained under the conditions outside the present invention had sufficient fluidity, while the crystal nucleating agents for polyolefin resins of the present invention exhibited greatly improved fluidity, thus having very excellent fluidity.

Comparing with the results of Examples 24 to 32 in Tables 5 and 6, the haze values of Comparative Examples 8 and 9 and those of Comparative Examples 12 and 13 in Table 7 were greatly decreased. The evaluation of white spots showed that white spots, that is, undispersed matter, tended to increase in these comparative examples. The results show that fluidity improvement under conditions outside the present invention tends to decrease the original properties of the crystal nucleating agent for polyolefin resins such as transparency.

INDUSTRIAL APPLICABILITY

The crystal nucleating agent for polyolefin resins of the present invention has greatly improved fluidity, and can be used in various applications as a crystal nucleating agent having very excellent fluidity. The crystal nucleating agent for polyolefin resins of the present invention is also equal to or greater than conventional crystal nucleating agents in terms of the dispersibility or solubility in polyolefin resins, and is very useful in terms of the performance of molded articles. Accordingly, the crystal nucleating agent for polyolefin resins of the present invention can remarkably contribute to the improvement of the productivity or the like in various applications. The resulting polyolefin resin molded article is not likely to suffer disadvantages such as white spots caused by a non-dispersed matter or non-dissolved matter of the crystal nucleating agent and is excellent in optical characteristics (e.g., transparency) and mechanical characteristics (e.g., impact resistance) to be usable for various applications including automobile parts, electric parts, machine components, commodities, cases for cloths or the like, and containers for food or the like.

The invention claimed is:

1. A crystal nucleating agent composition for a polypropylene random copolymer, the crystal nucleating agent composition comprising at least a raw material crystal nucleating agent as a component (A), a sulfuric acid ester salt and/or a sulfonic acid salt as a component (E) and a higher fatty acid as a component (F),
wherein the component (A) is a diacetal compound represented by the following formula (1):

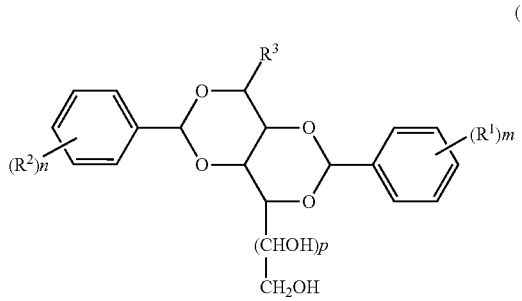

wherein R1 and R2 are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; R3 represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two R1s optionally bind to each other to form a tetralin ring together with a benzene ring to which they are bonded and two R2s optionally bind to each other to form a tetralin ring together with a benzene ring to which they are bonded,
wherein the component (E) is sodium lauryl sulfate and/or sodium dodecyl benzene sulfonate,
wherein the component (F) is stearic acid and/or 12-hydroxystearic acid,
wherein the crystal nucleating agent composition contains the component (E) in an amount of 1.0 to 2.5 parts by weight relative to 100 parts by weight of the component (A), and the component (F) in an amount of 0.5 to 2.5 parts by weight relative to 100 parts by weight of the component (A), and has a ratio of the component (E) to the component (F), (E)/(F), in a range of 1/2.5 to 4/1,
wherein the crystal nucleating agent composition for a polypropylene random copolymer has an angle of repose of 48° or smaller, and
wherein the crystal nucleating agent composition has a compression ratio determined from an aerated bulk density and a packed bulk density (packed bulk density/aerated bulk density) of 1.4 or lower.

2. The crystal nucleating agent composition for a polypropylene random copolymer according to claim 1, wherein in the formula (1), $R^1$ and $R^2$ are the same as or different from each other and each represent a methyl group or an ethyl group, $R^3$ represents a hydrogen atom, m and n each represent an integer of 1 or 2, and p represents 1.

3. The crystal nucleating agent composition for a polypropylene random copolymer according to claim 1, wherein in the formula (1), $R^1$ and $R^2$ are the same as or different from each other and each represent a propyl group or a propoxy group, $R^3$ represents a propyl group or a propenyl group, m and n each represent 1, and p represents 1.

4. The crystal nucleating agent composition for a polypropylene random copolymer according to claim 1,
wherein the crystal nucleating agent composition is obtained by preparing a mixture of the component (A) swelled with an organic solvent, the component (E) dissolved in the organic solvent, and the component (F) in a powdery or granular form and removing the organic solvent from the mixture.

5. The crystal nucleating agent composition for a polypropylene random copolymer according to claim 4, wherein the organic solvent is a C1-C4 lower alcohol.

6. A method for producing a crystal nucleating agent composition for a polypropylene random copolymer according to claim 1, comprising:
mixing a raw material crystal nucleating agent as a component (A) swelled with an organic solvent, 1.0 to 2.5 parts by weight of sodium lauryl sulfate and/or sodium dodecyl benzene sulfonate as a component (E) dissolved in the organic solvent relative to 100 parts by weight of the component (A), and 0.5 to 2.5 parts by weight of stearic acid and/or 12-hydroxystearic acid as a component (F) in a powdery or granular form relative to 100 parts by weight of the component (A) to a ratio of the component (E) to the component (F), (E)/(F), of 1/2.5 to 4/1, followed by removing the organic solvent.

7. A polyolefin resin composition comprising:
a polypropylene random copolymer; and
the crystal nucleating agent composition for a polypropylene random copolymer according to claim 1.

8. A method for improving the fluidity of a crystal nucleating agent composition for a polypropylene random copolymer, comprising:
mixing a raw material crystal nucleating agent as a component (A) swelled with an organic solvent, 1.0 to 2.5 parts by weight of sodium lauryl sulfate and/or sodium dodecyl benzene sulfonate as a component (E) dissolved in the organic solvent relative to 100 parts by weight of the component (A), and 0.5 to 2.5 parts by weight of stearic acid and/or 12-hydroxystearic acid as a component (F) in a powdery or granular form relative to 100 parts by weight of the component (A) to a ratio of the component (E) to the component (F), (E)/(F), of 1/2.5 to 4/1, followed by removing the organic solvent,
wherein the crystal nucleating agent composition comprises at least a raw material crystal nucleating agent as a component (A), sodium lauryl sulfate and/or sodium dodecyl benzene sulfonate salt as a component (E) and stearic acid and/or 12-hydroxystearic acid as a component (F),
wherein the component (A) is a diacetal compound represented by the following formula (1):

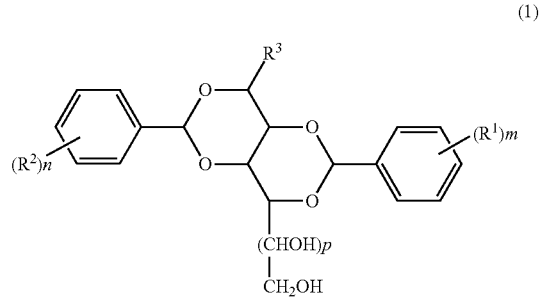

wherein R1 and R2 are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; R3 represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two R1s optionally bind to each other to form a tetralin ring together with a benzene ring to which they are bonded and two R2s optionally bind to each other to form a tetralin ring together with a benzene ring to which they are bonded, wherein the crystal nucleating agent composition contains the component (E) in an amount of 1.0 to 2.5 parts by weight relative to 100 parts by weight of the component (A), and the component (F) in an amount of 0.5 to 2.5 parts by weight relative to 100 parts by weight of the component (A), and has a ratio of the component (E) to the component (F), (E)/(F), in a range of 1/2.5 to 4/1, wherein the crystal nucleating agent composition for a polypropylene random copolymer has an angle of repose of 48° or smaller, and wherein the crystal nucleating agent composition has a compression ratio determined from an aerated bulk density and a packed bulk density (packed bulk density/aerated bulk density) of 1.4 or lower.

\* \* \* \* \*